(12) United States Patent
Batke et al.

(10) Patent No.: US 7,200,649 B1
(45) Date of Patent: Apr. 3, 2007

(54) ADAPTIVE METHOD FOR DUPLICATIVE IP ADDRESS DETECTION

(75) Inventors: Brian Alan Batke, Novelty, OH (US); Gary W. Baczkowski, Seven Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 918 days.

(21) Appl. No.: 09/965,267

(22) Filed: Sep. 27, 2001

(51) Int. Cl.
*G06F 15/177* (2006.01)

(52) U.S. Cl. .................. 709/222; 370/252; 370/256

(58) Field of Classification Search ................ 709/220, 709/226, 245; 370/392, 389, 252, 256; 725/81; 455/428; 714/43
See application file for complete search history.

(56) References Cited

U.S. PATENT DOCUMENTS

| | | | |
|---|---|---|---|
| 5,229,988 A | | 7/1993 | Marbaker et al. |
| 5,283,571 A | * | 2/1994 | Yang et al. ............. 340/825.52 |
| 5,327,534 A | * | 7/1994 | Hutchison et al. .......... 709/226 |
| 5,557,748 A | | 9/1996 | Norris |
| 5,708,654 A | | 1/1998 | Arndt et al. |
| 5,724,510 A | * | 3/1998 | Arndt et al. ................. 709/220 |
| 5,758,282 A | * | 5/1998 | Yamashina et al. ......... 455/428 |
| 5,854,901 A | * | 12/1998 | Cole et al. ................... 709/245 |
| 5,862,452 A | * | 1/1999 | Cudak et al. ................. 725/81 |
| 6,061,739 A | * | 5/2000 | Reed et al. ................. 709/245 |
| 6,493,340 B1 | * | 12/2002 | Kawanaka ................... 370/392 |
| 6,535,490 B1 | * | 3/2003 | Jain ........................... 370/256 |
| 6,795,403 B1 | * | 9/2004 | Gundavelli ................. 370/256 |
| 6,925,079 B2 | * | 8/2005 | Matsukawa ................. 370/389 |
| 7,027,406 B1 | * | 4/2006 | Shabtay et al. ............. 370/252 |
| 2001/0017857 A1 | * | 8/2001 | Matsukawa ................. 370/392 |
| 2003/0140283 A1 | * | 7/2003 | Nishio ........................ 714/43 |

FOREIGN PATENT DOCUMENTS

JP          20010017857          8/2001

* cited by examiner

*Primary Examiner*—Nathan J. Flynn
*Assistant Examiner*—Dustin Nguyen
(74) *Attorney, Agent, or Firm*—Amin Turocy & Calvin LLP; R. Scott Speroff

(57) ABSTRACT

A method for detecting and preventing the use of duplicate IP addresses is provided. The method involves sending ARP probes onto a network to determine whether an IP address that a device desires to employ is a duplicate IP address. The method further involves determining whether a probing entity is connected to an active network before identifying a potentially duplicate IP address as a non-duplicate IP address.

16 Claims, 16 Drawing Sheets

ADAPTIVE METHOD FOR DUPLICATIVE IP ADDRESS DETECTION

TECHNICAL FIELD

The present invention relates generally to data communications, and in particular to a method for detecting and preventing the use of duplicate IP addresses in the industrial automation setting.

BACKGROUND

Current methods for detecting duplicate IP addresses do not work well in industrial automation settings. For example, current methods do not resolve problems like: (1) devices powering up without being connected to a network, establishing their IP address (which is potentially a duplicate) and then later connecting (where the duplicate IP address will cause conflicts) (2) a sending device connected to a store and forward device (e.g., switch) having its initial outgoing packets discarded so that the sending device believes it does not have a conflict due to a duplicate IP address, when such a conflict actually exists so that by the time initial outgoing packets are sent, the IP address has been established for the sending device and conflicts due to duplicate IP addresses result and (3) several devices (with potentially duplicate IP addresses) booting up at the same time and attempting to use the same IP address experiencing race conditions that may lead sending devices to believe that they have a unique IP address, when in fact they do not, with resulting conflicts due to duplicate IP addresses occurring.

To understand the problems associated with duplicate IP addresses and the conventional ARP (Address Resolution Protocol) methods (as implemented for broadcast-capable media such as Ethernet) that contribute to such problems, a brief review of Internet addressing (via TCP (Transmission Control Protocol) and IP (Internet Protocol)) is beneficial. ARP is implemented as part of the IP layer and/or is associated with the IP layer in many network protocol stacks and is responsible for resolving IP addresses to physical network addresses. For instance, if a machine "A" recorded the IP address of machine "B" as 111.222.333.444, and if machine A wants to communicate with machine B, then ARP can be employed to determine the physical address of machine B. Machine A will cast a broadcast packet onto the network as an ARP request, with the following question coded into the ARP request:

For the IP address 111.222.333.444, whose physical address I do not know, but with which I would like to communicate, what is the physical address?

It is to be appreciated that the actual text of the question is not coded in the ARP request, but rather various data values (e.g., bit fields, flags, indicators) are employed to convey the meaning of the question. Because an ARP request is a broadcast request, active machines implementing IP on the network receive the ARP request with the embedded question and query their data stores to determine whether the IP address referenced in the ARP request is their IP address. If an active machine implementing IP on the network determines that it has the referenced IP address, then it replies to the sending machine with the answer:

My IP address is 111.222.333.444, and my physical address is aabbcdeeff. Because sending ARP requests and resolving IP addresses to physical addresses consumes time and computing resources, machines implementing IP and ARP typically have an ARPCache, wherein resolved IP address, physical address pairs are stored. For example, after the exchange detailed above, the ARPCache of machine A may contain, among other records:

| IP address | Physical address | |
|---|---|---|
| 111.222.333.444 | aabbcdeeff | <= address just resolved (machine B) |
| 11.22.33.44 | 1234abcd | <= Machine A's address |

The entry for 11.22.33.44 belongs to machine A itself, and is generally considered a "static" entry that is not changed dynamically.

Problems with duplicate addresses can arise when a second machine connects to the network and broadcasts its IP address and physical address onto the network. For example, if the aforementioned machines A and B are communicating, with machine A having the ARPCache table described above, and during that time, machine C boots up, where machine C has the same IP address as B, a duplicate IP address conflict may ensue. For example, machine C, according to one ARP protocol may broadcast an ARP message that conveys the information that:

I am machine C, my IP address is 111.222.333.444 and my physical address is 579acf579.

Machines implementing IP and ARP may then place the newly provided address resolution pair in their ARPCaches, and may overwrite any previous mapping for the IP address (assuming, for example, that the IP/physical address resolution was updated), except that static addresses will not be overwritten. Thus, the ARPCache for machine A could change to:

| IP Address | Physical Address | |
|---|---|---|
| 111.222.333.444 | 579acf579 | <= address just changed (machine C) |
| 11.22.33.44 | 1234abcd | <= Machine A's address |

Henceforth, packets intended to be transmitted from A to B are routed from A to C, which is conventionally undesirable. Existing communication streams (e.g., TCP connections) between Machine A and Machine B may be interrupted. Machine C may then receive incoming packets that were intended for Machine B. In industrial automation applications where control information is being sent over a network, this could comprise the integrity and safety of the system. Thus, conventionally, network administrators have been faced with the difficult task of preventing the use of duplicate IP addresses and, if such prevention is not successful, the difficult task of debugging duplicate IP address problems. Thus, there remains a need for a system and method for mitigating the problems caused by such duplicate addresses.

SUMMARY

The following presents a simplified summary of the invention in order to provide a basic understanding of some aspects of the invention. This summary is not an extensive overview of the invention. It is intended to neither identify key or critical elements of the invention nor to delineate the scope of the invention. Its sole purpose is to present some concepts of the invention in a simplified form as a prelude to the more detailed description that is presented later.

The present invention involves a method that performs its actions before a device begins unrestricted use of an IP address. Before setting an IP address (e.g., for a device attaching to a network, for a device powering up, for a device changing its IP address), the method first generates a random time delay that facilitates mitigating the simultaneous start up problem. After waiting the random time delay period, the method sends an ARP "probe" onto the network with which it desires to interact. The probe is an ARP request for the new, and potentially duplicate IP address, with a sender IP address of 0.0.0.0, which prevents the ARPCaches of receiving machines from being updated with the sender's IP address and physical address (e.g., Ethernet address). The probe contains the physical address of the probing machine so that the receiving machine can route a response.

If there is a response to the probe, indicating that an IP/physical address resolved pair exists on the network, then the probing device knows that the IP address about which it probed is a duplicate. Thus, the probing device shuts down its network interface and does not use the duplicate IP address. In some cases the probing device may then attempt the method with a different IP address.

If the probing device receives no reply to the probe, then the probing device must determine whether no reply was received because there is no IP/physical address resolved pair on the network that was probed or whether no reply was received because the probing device is not connected to an active network. Thus, the probing device can continue to periodically (e.g., every two seconds) send ARP requests, with the sender IP address of 0.0.0.0 and can verify that it is connected to an active network by methods including, but not limited to (1) monitoring packets on the network interface that indicate the network is active, (2) analyzing a "link pulse" (e.g., hardware means indicating network is active) and (3) analyzing BPDUs (Bridge Protocol Data Units). The method that employs listening for BPDUs (which are "hello packets" employed in spanning tree algorithms to ensure that physical loops in a network topology do not result in logical looping of network traffic) includes determining whether BPDUs are encountered, and if such BPDUs are encountered, then continuing to send ARP requests with sender IP address of 0.0.0.0 for a period longer than the maximum device forward-delay time (e.g., 30 seconds) of a network device located between the network and the probing device (e.g., a switch). If no reply to a probe ARP request is received after the maximum device forward-delay time, then the method assumes that the IP address about which the method has been probing is not a duplicate and that the IP address can be used.

Once the device that is probing about an IP address has determined that it is on an active network, with its packets being forwarded, then in one example of the present invention the probing device will send a number of follow-on ARP requests (e.g., four in 2 seconds) to re-verify that there is not a duplicate IP address conflict. If no reply to such follow-on probes is encountered, then the probing device will employ the IP address (which is now assumed not to be a duplicate) and broadcast its IP/physical address resolution pair to the network. If a reply to the follow-on probes is encountered, then the probing device will shut down the network interface and will not use the duplicate IP address. However, in one example of the present invention, the probing device may try a different IP address (e.g., from a pool of available addresses).

In accordance with an aspect of the present invention, a method for a probing entity to detect a duplicate IP address is provided. The method includes generating an identifying value that identifies a random period of time to wait before probing a network with which a probing entity desires to interact and then waiting that random period of time. The method further includes sending first ARP probes onto the network with which the probing entity desires to interact and then determining whether a response to such probes indicates that there is a duplicate IP address conflict. The method further includes determining whether the probing entity is connected to an active network, and if such active network is detected, sending second ARP probes onto the network and determining whether a response to the second ARP probes indicates that there is a duplicate IP address conflict.

Another aspect of the present invention provides a computer readable medium storing computer executable instructions operable to perform a method for a probing entity to detect a duplicate IP address. The method includes generating an identifying value that identifies a random period of time to wait before probing a network with which a probing entity desires to interact and then waiting that random period of time. The method further includes sending ARP probes onto the network with which the probing entity desires to interact and determining whether a response to such probes indicates that there is a duplicate IP address conflict. The method further includes determining whether the probing entity is connected to an active network, sending one or more second ARP probes onto the network and determining whether a response to the second ARP probes indicates that there is a duplicate IP address conflict.

Yet another aspect of the present invention provides a system for detecting and preventing the use of duplicate IP addresses. The system includes a random time period generator operable to produce a value representing a period of time that a probing entity should wait before invoking the processing of a probe generator and a probe generator operable to produce an ARP probe. The system further includes a response analyzer operable to analyze a response to an ARP probe and to determine whether the response to the ARP probe indicates that an IP address associated with the probing entity is a duplicate IP address and an active network detector operable to determine whether the system is connected to an active network.

To the accomplishment of the foregoing and related ends, the invention, then, comprises the features hereinafter fully described and particularly pointed out in the claims. The following description and the annexed drawings set forth in detail certain illustrative aspects of the invention. These aspects are indicative of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Prior Art

Prior Art

Prior Art

Prior Art

Prior Art

Prior Art

Prior Art

Prior Art

Prior Art

Prior Art

DETAILED DESCRIPTION

Figure 1:
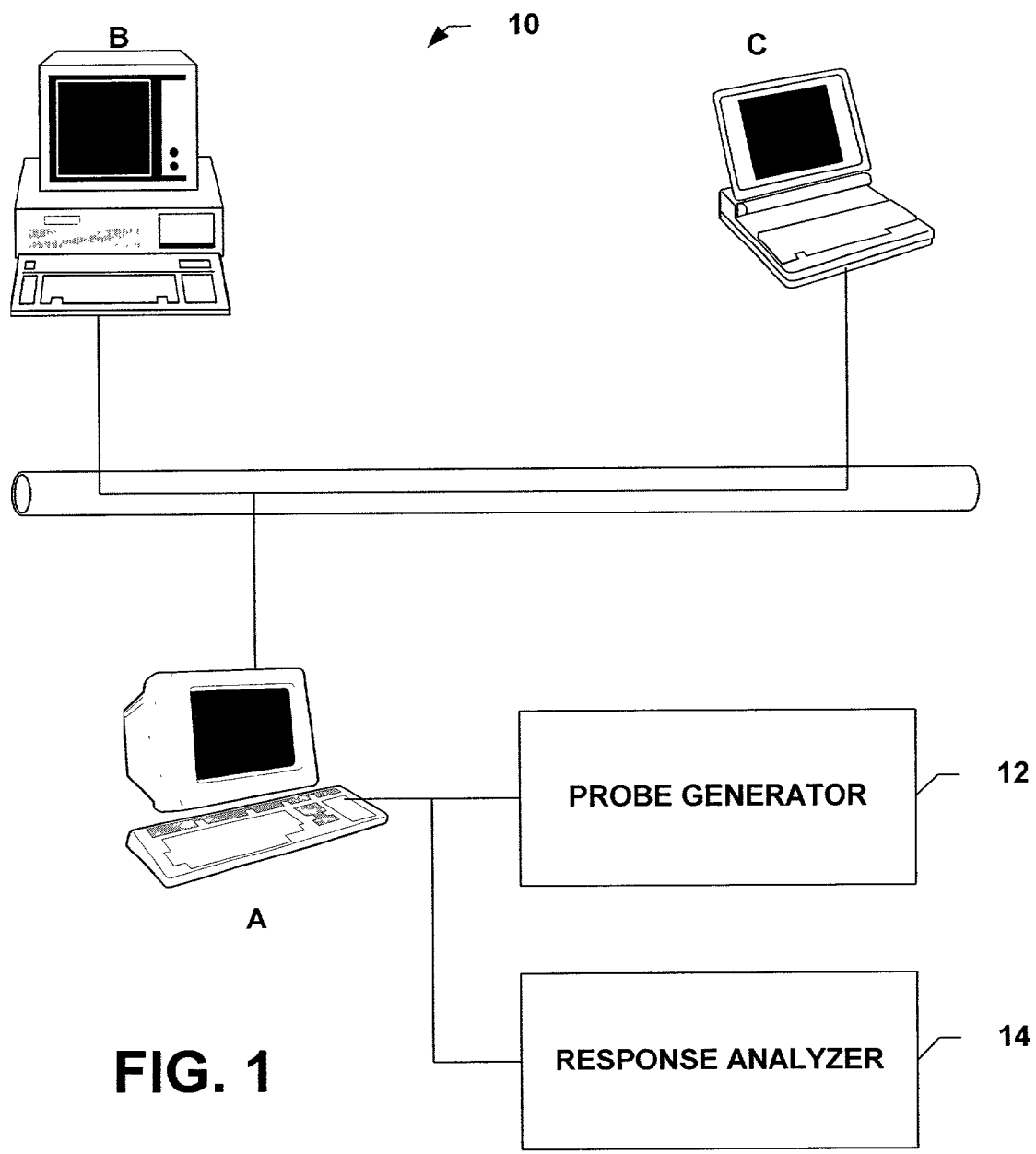
FIG. 1 is a schematic block diagram illustrating a system for probing a network to determine whether a probing device has a duplicate IP address in accordance with an aspect of the present invention.

The present invention will now be described with reference to the drawings, wherein like reference numerals are used to refer to like elements throughout. The present invention will be described with reference to a method for detecting and preventing the use of duplicate IP addresses. The following detailed description is of the best modes presently contemplated by the inventors for practicing the invention. It should be understood that the description of these aspects are merely illustrative and that they should not be taken in a limiting sense.

As used in this application, the term "component" is intended to refer to a computer-related entity, either hardware, a combination of hardware and software, software, or software in execution. Thus, a component may be, but is not limited to being, a process running on a processor, a processor, an object, an executable, a thread of execution, a program and a computer. By way of illustration, both an application running on a computer and the computer can be components. One or more components may reside within a process and/or thread of execution and a component may be localized on one computer and/or distributed between two or more computers.

Referring initially to FIG. 1, a system 10 for probing a network to determine whether a probing device A has a duplicate IP address is illustrated. The probing device A is operatively connected to a probe generator 12 and a response analyzer 14. The probe generator 12 can be employed to produce an ARP probe, wherein the source IP address is left unpopulated (so that receiving machines will not update their ARPCaches), the source hardware address is populated (so that receiving machines can return a response), the target IP address is populated with the potentially duplicate IP address of the probing entity A and the target hardware address is populated with a value that indicates that the ARP probe is seeking the hardware address associated with the target IP address.

The system 10 also includes a response analyzer 14 that can be employed to determine whether ARP responses provided to the system 10 indicate that a duplicate IP address has been encountered. The response analyzer 14 is operable to determine whether an ARP response has been received, whether the ARP response is related to an ARP probe sent by the probing entity A and comparing an IP address/physical address pair received in an ARP response packet to the potentially duplicate IP address associated with the machine A with which the response analyzer 14 is associated.

The present invention thus relates to probing for duplicate IP addresses. Background information concerning various aspects of IP addressing, TCP protocol, networking and various aspects of the present invention is found at the end of this section in connection with prior Art FIGS. 2 through 11.

Figure 12:
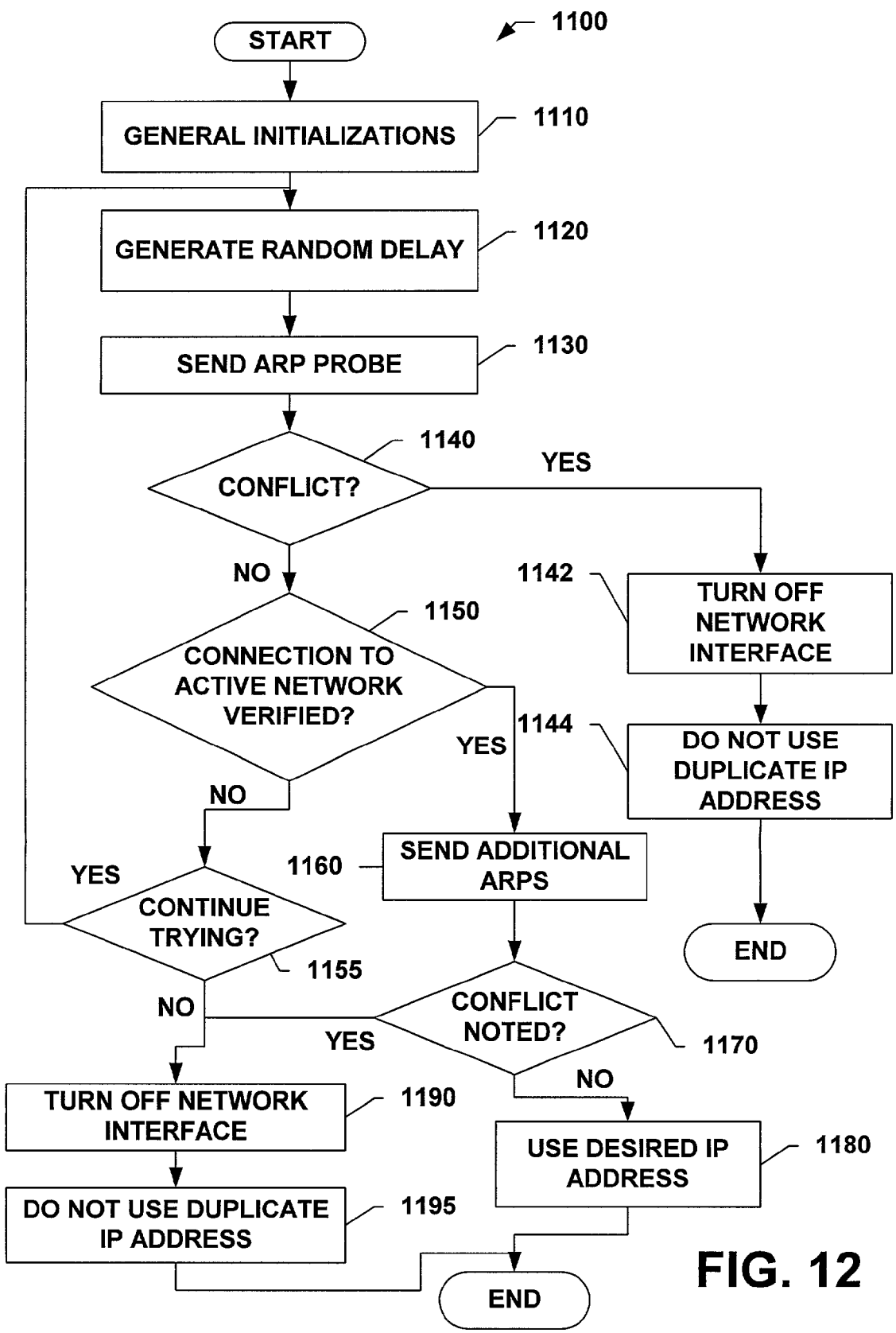
FIG. 12 is a flow diagram illustrating one specific methodology for carrying out the present invention.

A methodology, which may be implemented in accordance with the present invention, is presented in the flow diagram of FIG. 12. While for purposes of simplicity of explanation the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

Referring now to FIG. 12, a method 1100 for practicing the present invention is flow-charted. At 1110, general initializations are made to the method 1100 for detecting and preventing the use of duplicate IP addresses. The initializations may include, but are not limited to, establishing data communications, determining the type or types of processes and/or components available to the method and setting up data stores.

At 1120, a random time delay is generated. Devices employing method 1100 benefit from generating a random delay since such a random delay facilitates mitigating problems with devices that come online at substantially the same time. Conventionally, such devices could attempt to determine whether there is a duplicate IP address problem substantially contemporaneously, with such contemporaneous detection leading to race conditions that could lead to devices determining that they do not have a duplicate IP address, when in fact they do have a duplicate IP address. The random time delay facilitates mitigating such race conditions by staggering the times at which devices begin determining whether they have a duplicate IP address problem.

At 1130, after waiting the random period of time of 1120, an ARP probe is cast onto the network with which the connecting device desires to interact. The ARP probe will have the target IP address populated, but the target physical address will not be populated because the sending machine is inquiring if another machine has a physical address for the target IP address. The source IP address is not populated to prevent ARPCache updates while the source hardware address is populated so that the receiving machine can route the response. By not populating the source IP address, the ARP probe will not have the effect of updating the ARPCaches of receiving machines that would have been updated if the source IP address and source physical address had been populated and the ARPCaches did not have entries for the source IP address physical address pair. Thus, processing that leads to one of the conditions precedent to producing duplicate IP address problems is removed through the use of the ARP probe.

At 1140, a determination is made concerning whether transmitting the ARP probe revealed any duplicate IP address conflicts. For example, if a response to the ARP probe was received (with routing facilitated by the probing entity providing its physical address), and the source IP address matched the probing entity IP address, then the probing entity would be able to determine that it had a duplicate IP address, and that it should not employ that duplicate IP address. If the determination at 1140 is YES, that a duplicate IP address conflict was noted, then at 1142 the probing entity may turn off its network interface and at 1144 the probing entity will undertake processing steps to insure that the duplicate IP address is not employed. For example, one or more flags may be set, data values may be established and/or hardware control bits may be manipulated. If the determination at 1140 is NO, that no conflict was noted, then at 1150 a subsequent determination is made.

At 1150, a determination is made concerning whether a connection to an active network has been verified. This determination serves to strengthen the preliminary determination of 1140 that no duplicate IP problem is going to be created by the probing entity. Such strengthening is beneficial because the determination of 1140 may have been based on incomplete information. For example, the determination at 1140 may have been based on whether a reply to the ARP probe of 1130 was encountered. But no reply may have been encountered because the probing device was not connected to an active network. Thus, the determination at 1150 may be based on methods including, but not limited to (1) viewing other network traffic that indicates that the probing entity is connected to an active network (e.g., communications between other machines), (2) analyzing hardware network signals (e.g., electrical connectivity signals (e.g., CD, DTR)) and (3) analyzing BPDU (Bridge Protocol Data Unit) traffic. If the determination at 1150 is NO, then at 1155 a determination is made concerning whether the probing entity should continue trying to determine whether it can employ the potentially duplicate IP address. For example, a data value associated with a time period may be examined to determine whether a maximum probing time has expired, or a retry counter may be examined to determine whether a maximum number of retries has been exceeded. If the determination at 1155 is YES, then processing continues at 1120, otherwise, processing proceeds to 1190 where the probing entity can shut off its network interface and at 1195 undertake processing substantially similar to that of 1144 to insure that the IP address is not employed by the probing entity.

If the determination at 1150 is YES, that a connection to an active network has been verified, then at 1160 additional ARP probes may be cast onto the network to re-verify that a duplicate IP address conflict does not exist. For example, in one example of the method 1100, four additional probes will be sent during a two second time period. At 1170 a determination is made concerning whether any duplicate IP address conflict is noted in response to the additional ARP probes of 1160. If the determination at 1170 is YES, then processing proceeds to 1190. If the determination at 1170 is NO, then the method proceeds to 1180 where processing associated with employing the IP address is undertaken. For example, processing including, but not limited to, populating one or more data fields, setting and/or clearing one or more flags, populating one or more ARPCaches and broadcasting one or more ARP broadcasts of IP address/physical address pairs may be undertaken.

Figure 13:
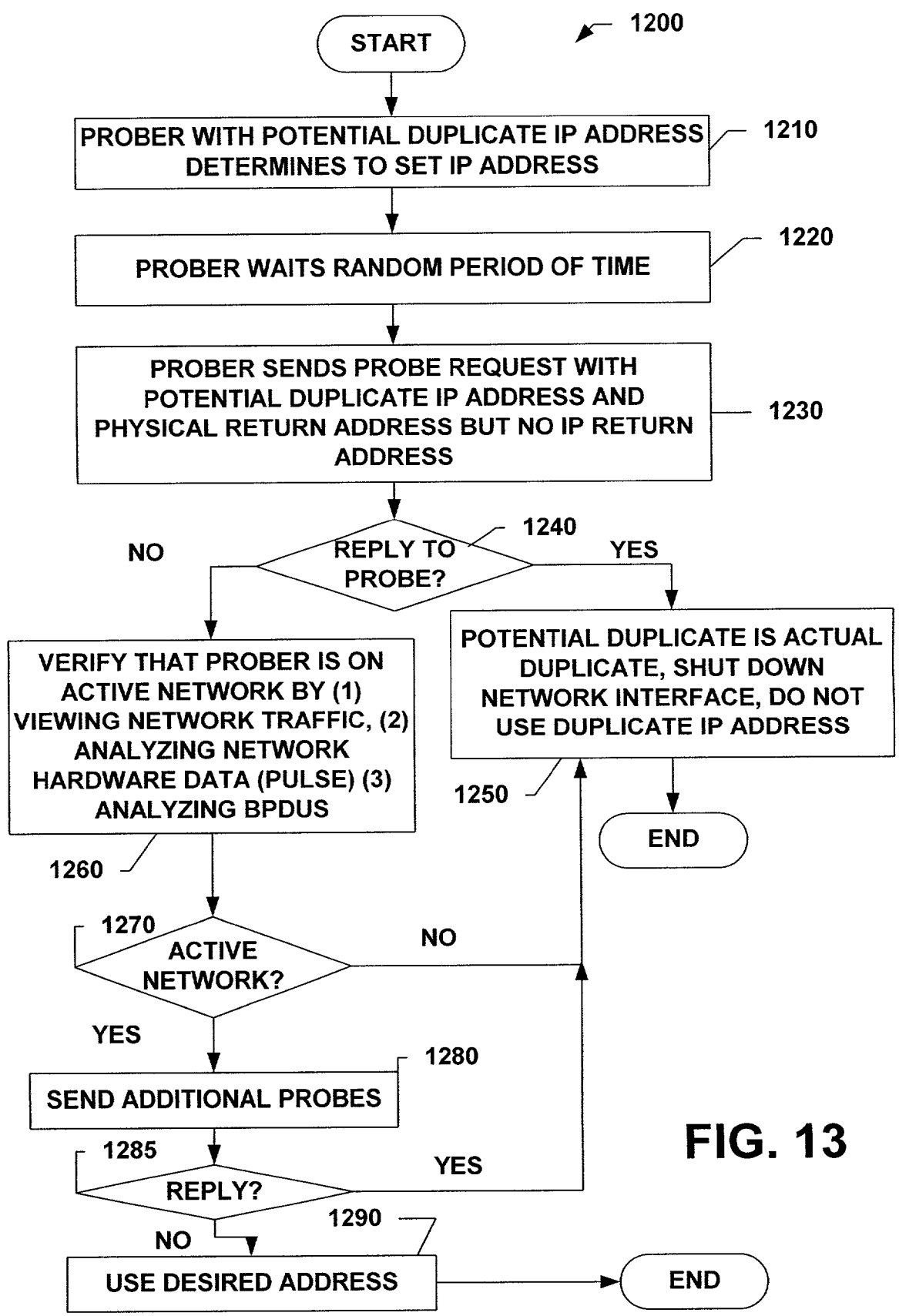
FIG. 13 is a flow diagram illustrating a specific methodology for carrying out the present invention.

FIG. 13 is a flow chart that illustrates another possible methodology 1200. The flowchart identifies processing that can be undertaken when a probing entity decides to set its IP address. This could be in response to the probing entity coming online, the probing entity determining to communicate over a network and at other such times. In the industrial automation setting, it is possible that a device may come on line where that device is not connected to the network. Then, at a later time, the device is connected to the network and will need to determine whether there is a duplicate IP address problem. Thus, at 1210, the newly connected device will determine to set an IP address. At 1220, the newly connected device will thus wait a random period of time to mitigate race condition problems associated with conventional systems. In the industrial automation context, when it is likely that a plurality of devices may come online at substantially the same time (e.g., during a plant power up, during a network reboot), such conventional race condition problems produce unacceptable duplicate IP resolution.

At 1230, after waiting the random period of time, the probing entity (e.g., newly connected device) probes the network with the potentially duplicate IP address, and crafts the ARP probe so that receiving machines will be able to respond to the ARP probe (via the populated physical address) but so that receiving machines will not be able to update their ARPCaches (due to the non-populated IP address).

At 1240, a determination is made concerning whether the probing entity received a reply to the probe. If the determination at 1240 is YES, then at 1250, the probing entity will not use the duplicate IP address, but rather will shut down its network interface to mitigate duplicate IP problems. If the determination at 1240 is NO, that the probing entity does not receive a reply to the probe, then the probing entity will determine whether such lack of reply was due to there being no duplicate IP address, or whether the probe did not reach the network with which the probing entity desires to interact. Thus, at 1260, the probing entity determines whether it is connected to an active network by methods including, but not limited to (1) viewing and analyzing network traffic, (2) analyzing network hardware data and (3) analyzing BPDUs. At 1270, a determination is made concerning whether the probing entity is able to verify that it is connected to an active network. If the determination at 1270 is NO, then the probing entity is not able to verify that it is connected to an active network and the probing entity cannot safely employ the desired IP address and thus processing will continue at 1270. But if the probing entity is able to verify that it is connected to an active network, then at 1280, the probing entity can send additional probes and/or ARP requests (e.g., x requests in y period of time) as one last check before employing the potentially duplicate IP address.

Figure 14:
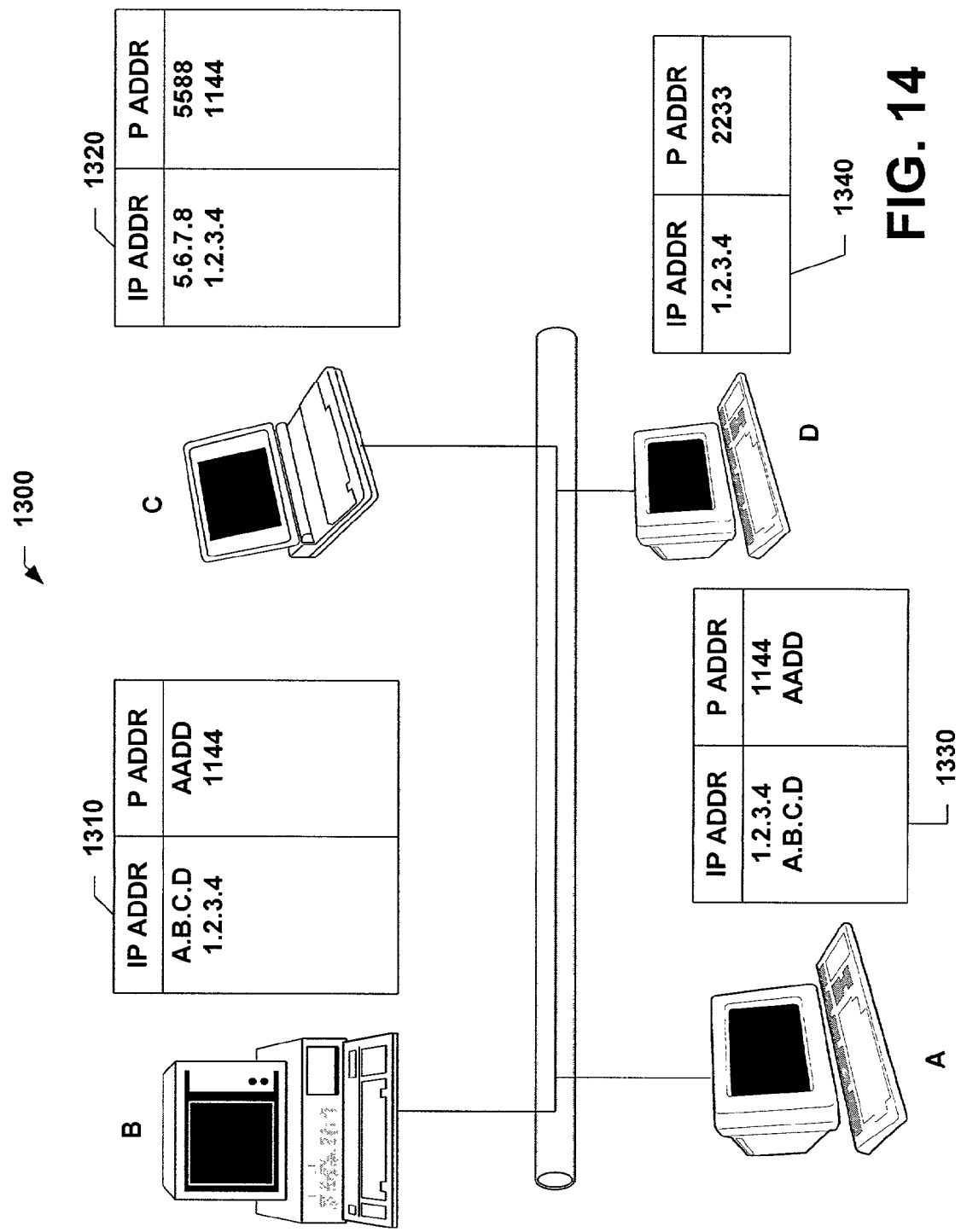
FIG. 14 is a schematic block diagram of four computers networked together, where the networking includes ARPCaches and where the fourth computer has come online and employed the method for determining whether it has a duplicate IP address in accordance with an aspect of the present invention.

Turning now to FIG. 14, four computers A, B, C, and D networked together are illustrated. Machines A, B and C had previously arrived at the state illustrated in Prior Art FIG. 10. Then, machine D came online and rather than announcing its presence via an ARP broadcast after waiting a random period of time, machine D employed an ARP probe and the method described above in connection with FIGS. 12 and 13 to determine whether there was a duplicate IP address conflict problem. While conventional systems may similarly generate an ARP probe, such conventional systems may not attempt to determine whether they are connected to an active network and may not employ the random time delay before sending the ARP probe(s). Note that machine D has an IP address 1.2.3.4 that is a duplicate of the IP address of machine A. However, the physical addresses (2233 and 1144) do not match.

In employing the method of the present invention, machine D sent a probe with the source IP address set to a flag value (e.g., 0) that indicates that the source IP address is not a valid IP address and thus the receiving machines (e.g., machine A, machine B, machine C) should not update their ARPCaches (e.g., ARPCache 1310, ARPCache 1320, ARPCache 1330) with the unresolved IP address/physical address pair. The probe includes the physical address of the probing entity so that receiving machines can route a reply if desired. The probe also includes a target IP address that is the potentially duplicate IP address that the probing entity desires to employ. When machines B and C encountered the probe, they determined that the target IP address was not their own, and thus they ignored the ARP probe. However, when machine A encountered the probe, it determined that the target IP address matched its IP address, and thus machine A sent a reply with its IP address as the source IP address and its physical address as the physical address. The reply was read by machine D, which determined that a duplicate IP address had been encountered, and thus machine D did not employ the now verified duplicate IP address. Thus, by employing the method described above, problems associated with detecting and preventing the use of duplicate IP addresses are mitigated.

Figure 15:
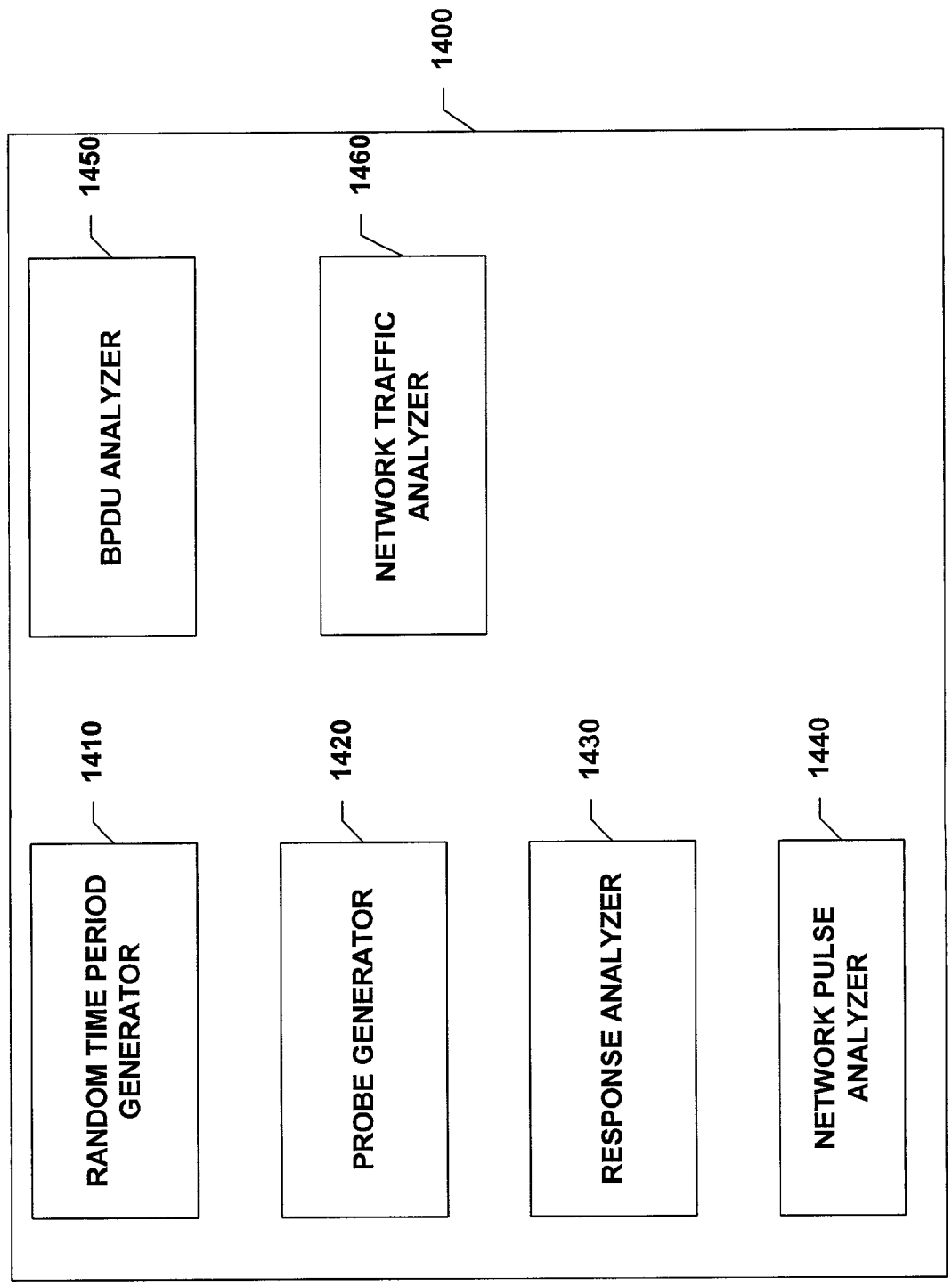
FIG. 15 is a schematic block diagram of a system for probing an ARP networking system to determine whether a probing device has a duplicate IP address.

Turning now to FIG. 15, a system 1400 for probing a network to determine whether a probing device has a duplicate IP address is illustrated. The system 1400 includes a random time period generator 1410 that can produce, for different machines with which the system 1400 interacts, values identifying different random periods of time that the machine should wait before invoking the processing of a probe generator 1420. The random time period generator 1410 may interact with values like an IP address, a physical address, a GUID (Globally Unique Identifier) and a time count to facilitate producing the random time period value.

The probe generator 1420 is a component that can be employed to produce an ARP probe, wherein the source IP address is left unpopulated (so that receiving machines will not update their ARPCaches), the source hardware address is populated (so that receiving machines can return a response), the target IP address is populated with the potentially duplicate IP address of the probing entity and the target hardware address is populated with a value that indicates that the ARP probe is seeking the hardware address associated with the target IP address. Although the probe generator 1420 is discussed primarily in connection with software, it is to be appreciated that the probe generator 1420 can be implemented as a computer-related entity, either hardware, a combination of hardware and software, software, or software in execution. Thus, the probe generator 1420 may be, but is not limited to being, a process running on a processor, a processor, an object, an executable, a thread of execution, a program and a computer. By way of illustration, both an application running on a computer and the computer can be a probe generator 1420. The probe generator 1420 may be localized on one computer and/or distributed between two or more computers.

The system 1400 includes a response analyzer 1430 that can be employed to determine whether ARP responses provided to the system 1400 indicate that a duplicate IP address has been encountered. Although the response analyzer 1430 is discussed primarily in connection with software, it is to be appreciated that the response analyzer 1430 can be implemented as a computer-related entity, either hardware, a combination of hardware and software, software, or software in execution. Thus, the response analyzer 1430 may be, but is not limited to being, a process running on a processor, a processor, an object, an executable, a thread of execution, a program and a computer. By way of illustration, both an application running on a computer and the computer can be a response analyzer 1430. The response analyzer 1430 may be localized on one computer and/or distributed between two or more computers. The response analyzer 1430 can perform processing including, but not limited to, determining whether an ARP response has been received, whether the ARP response is related to an ARP probe sent by the probing entity and comparing an IP address/physical address pair received in an ARP response packet to the potentially duplicate IP address associated with the machine with which the system 1400 is associated.

The system 1400 further includes a network traffic analyzer 1460 that can be employed to determine whether the machine associated with the system 1400 is attached to a live computer network. The network traffic analyzer 1460 may monitor and/or analyze items including, but not limited to, Ethernet frames, IP packets and datagrams to determine whether the machine associated with the system 1400 is attached to a live computer network. For example, the presence or absence of such Ethernet frames, IP packets and datagrams may indicate that a network connection is or is not operating. By way of illustration, if the network traffic analyzer 1460 detects no network traffic in the form of Ethernet frames, IP packets and datagrams, that may indicate that the machine associated with the system 1400 is not connected to a live network. By way of further illustration, if the network traffic analyzer 1460 detects network traffic in the form of Ethernet frames, IP packets and datagrams, that may indicate that the machine associated with the system 1400 is connected to a live network.

The system 1400 further includes a network pulse analyzer 1440 that can be employed to determine whether the machine associated with the system 1400 is attached to a live computer network. The network pulse analyzer 1440 may examine, for example, one or more electrical signals provided by one or more network devices (e.g., a switch, a gateway, a network interface card). The network pulse analyzer 1440 may not examine received digital data (e.g., frames and/or packets), but rather the network pulse analyzer 1440 may examine analog and/or digital hardware control signals, for example. The network pulse analyzer 1440 thus can be employed in determining whether a potentially duplicate IP address can be employed by a probing device by providing information that can be employed in conjunction with the response analyzer 1430.

The system 1400 further includes a BPDU (Bridge Protocol Data Unit) analyzer 1450 that can be employed to facilitate determining whether the probing entity associated with the system 1400 is connected to a live network. A BPDU is a "hello packet" that is employed in algorithms (e.g., spanning tree algorithms) to verify that physical loops in a network topology do not result in logical looping of network traffic. As such, analysis of BPDUs can be employed to determine whether a probing entity associated with the system 1400 is connected to a live network. For example, encountering a first number of a first type of BPDUs can indicate that a network is not live, while encountering a second number of a second type of BPDUs can indicate that a network is live. Thus, the BPDU analyzer 1450 can be employed in determining whether a potentially duplicate IP address can be employed by a probing device by providing information that can be employed in conjunction with the response analyzer 1430.

Figure 16:
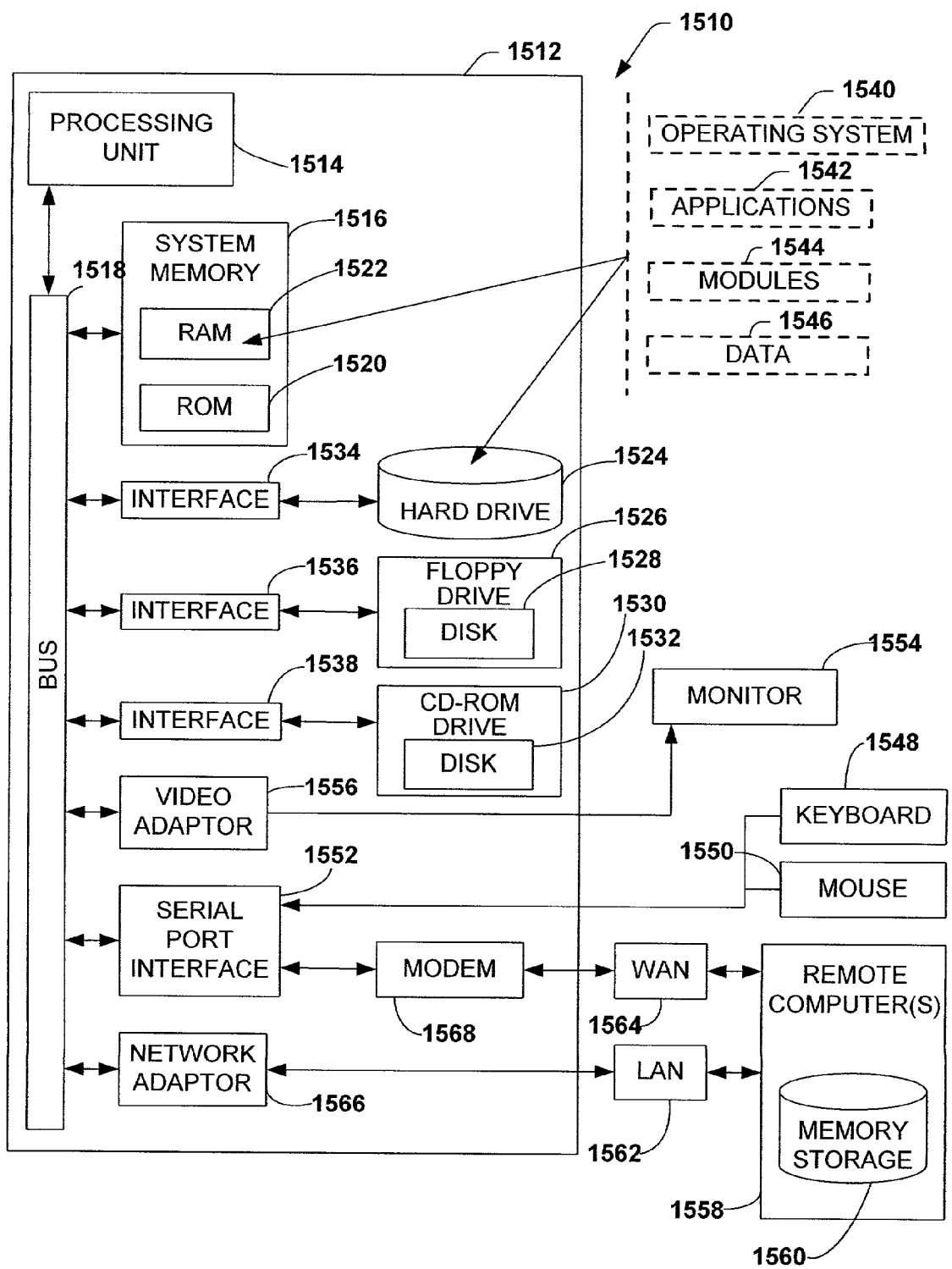
FIG. 16 is a block diagram of an exemplary operating environment for a system configured in accordance with the present invention.

In order to provide additional context for various aspects of the present invention, FIG. 16 and the following discussion are intended to provide a brief, general description of a suitable computing environment 1510 in which the various aspects of the present invention can be implemented. While the invention has been described above in the general context of computer-executable instructions that may run on one or more computers, it is to be appreciated that the invention also may be implemented in combination with other program modules and/or as a combination of hardware and software. Generally, program modules include routines, programs, components, data structures, etc. that perform particular tasks or implement particular abstract data types. It will be further appreciated that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 16, an exemplary environment 1510 for implementing various aspects of the invention includes a computer 1512, including a processing unit 1514, a system memory 1516, and a system bus 1518 that couples various system components including the system memory 1516 to the processing unit 1514. The processing unit 1514 may be any of various commercially available processors. Dual microprocessors and other multi-processor architectures also can be used as the processing unit 1514.

The system bus 1518 can be any of several types of bus structure including a memory bus or memory controller, a peripheral bus, and a local bus using any of a variety of commercially available bus architectures. The system memory 1516 includes read only memory (ROM) 1520 and random access memory (RAM) 1522. A basic input/output system (BIOS), containing the basic routines that help to transfer information between elements within the computer 1512, such as during start-up, is stored in ROM 1520.

The computer 1512 further includes a hard disk drive 1524, a magnetic disk drive 1526 to read from or write to, for example, a removable disk 1528, and an optical disk drive 1530 for reading, for example, from a CD-ROM disk 1532 or to read from or write to other optical media. The hard disk drive 1524, magnetic disk drive 1526, and optical disk drive 1530 are connected to the system bus 1518 by a hard disk drive interface 1534, a magnetic disk drive interface 1536, and an optical drive interface 1538, respectively. The drives and their associated computer-readable media provide nonvolatile storage of data, data structures, computer-executable instructions, etc. for the computer 1512, including for the storage of broadcast programming in a suitable digital format. Although the description of computer-readable media above refers to a hard disk, a removable magnetic disk and a CD, it should be appreciated that other types of media that are readable by a computer, such as magnetic cassettes, flash memory cards, digital video disks, Bernoulli cartridges, and the like, may also be used in the exemplary operating environment, and further that such media may contain computer-executable instructions for performing the methods of the present invention.

A number of program modules may be stored in the drives and RAM 1522, including an operating system 1540, one or more application programs 1542, other program modules 1544, and program data 1546. The operating system 1540 in the illustrated computer may be any of a variety of commercially available operating systems and/or proprietary operating systems.

A user may enter commands and information into the computer 1512 through a keyboard 1548 and a pointing device, such as a mouse 1550. Other input devices (not shown) may include a microphone, an IR remote control, a joystick, a game pad, a satellite dish, a scanner, or the like. These and other input devices are often connected to the processing unit 1514 through a serial port interface 1552 that is coupled to the system bus 1518, but may be connected by other interfaces, such as a parallel port, a game port, a universal serial bus ("USB"), an IR interface, etc. A monitor 1554 or other type of display device is also connected to the system bus 1518 via an interface, such as a video adapter 1556. In addition to the monitor, a computer typically includes other peripheral output devices (not shown), such as speakers, printers etc.

The computer 1512 may operate in a networked environment using logical connections to one or more remote computers, such as a remote computer(s) 1558. The remote computer(s) 1558 may be a workstation, a server computer, a router, a personal computer, a peer device or other common network node, and typically includes many or all of the elements described relative to the computer 1512, although, for purposes of brevity, only a memory storage device 1560 is illustrated. The logical connections depicted include a local area network (LAN) 1562 and a wide area network (WAN) 1564. Such networking environments are commonplace in offices, enterprise-wide computer networks, intranets and the Internet.

When used in a LAN networking environment, the computer 1512 is connected to the local network 1562 through a network interface or adapter 1566. When used in a WAN networking environment, the computer 1512 typically includes a modem 1568, or is connected to a communications server on the LAN, or has other means for establishing communications over the WAN 1564, such as the Internet. The modem 1568, which may be internal or external, is connected to the system bus 1518 via the serial port interface 1552 to enable communications, for example, via POTS. The modem 1568 may also, in an alternative embodiment, be connected to the network adaptor 1566 to enable communications, for example, via DSL or cable. In a networked environment, program modules depicted relative to the computer 1512, or portions thereof, will be stored in the remote memory storage device 1560. It may be appreciated that the network connections shown are exemplary and other means of establishing a communications link between the computers may be used.

Figure 2:
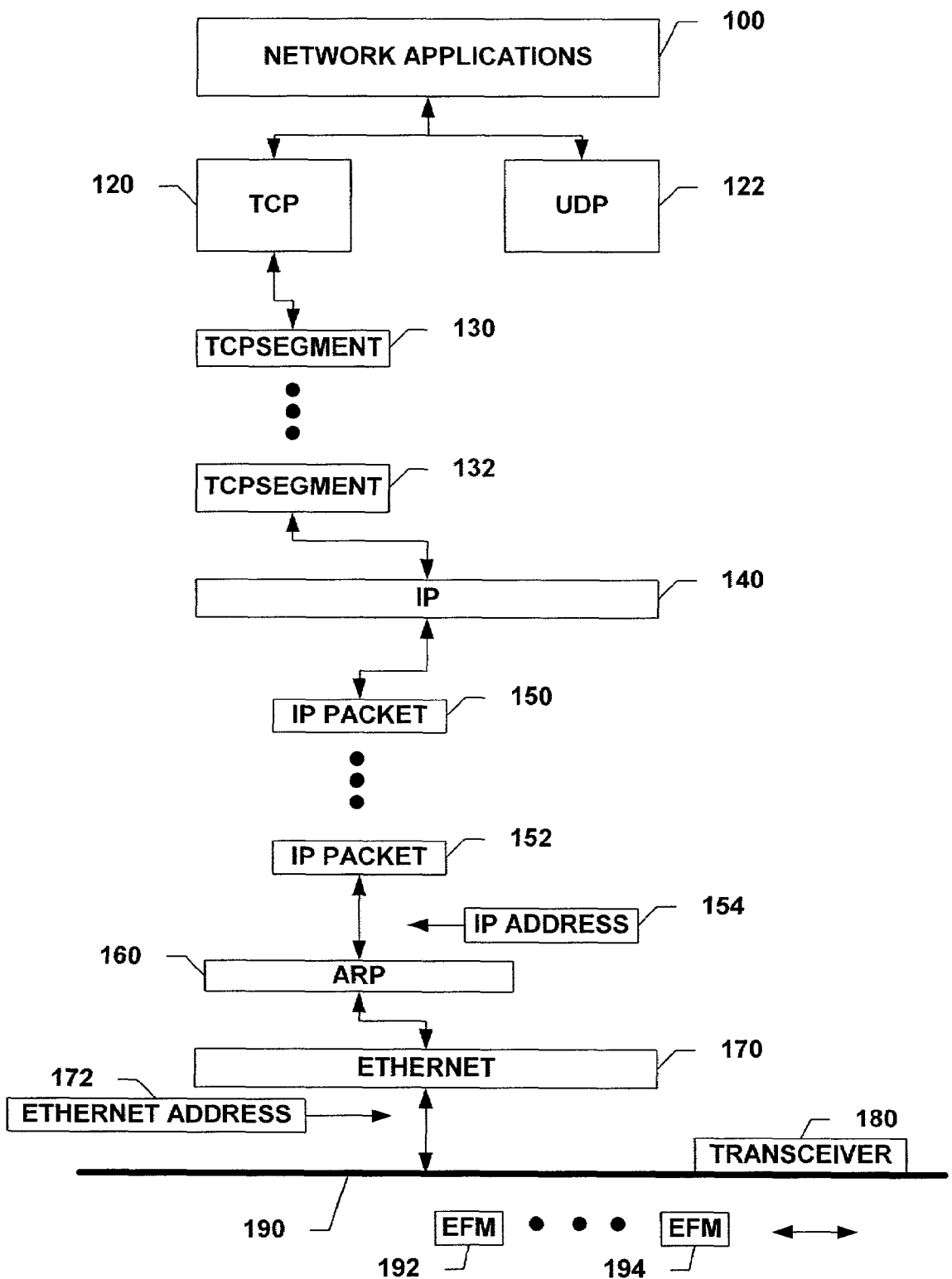
FIG. 2 is a schematic block diagram of a conventional TCP/IP node employing a conventional network stack with conventional TCP/IP (Transmission Control Protocol/Internet Protocol) message traffic.

Referring now to prior art FIG. 2, a basic TCP/IP node is illustrated. One or more network applications 100 sit at the top of the node and the implementing network stack, and communicate with components like a TCP protocol component 120 and a UDP protocol component 122. The TCP protocol component 120 communicates with an IP protocol component 140 via a plurality of TCP segments (a.k.a. transport messages) (e.g., TCP segments 130 through 132). The IP protocol component 140 in turn communicates with an Ethernet component 170 via a plurality of IP Packets (e.g., IP packets 150 through 152), where such IP packets may traverse an ARP component 160. Each device communicating with the Ethernet component 170 via the IP component 140 will have an IP address 154. The IP address 154 should be unique within a network, but in conventional systems duplicate IP addresses can be encountered, which causes problems, whose solution is the subject matter of the present invention. Similarly, each Ethernet component 170 with which devices communicate will have a unique physical address 172, where such address is generally assigned by the manufacturer of the component. The ARP component 160, as described above, is responsible for converting the IP address 154 to the Ethernet address 172. Although the ARP component 160 is illustrated distinctly from the IP component 140, it is to be appreciated that some protocol stacks may implement the ARP component 160 in the IP component 140. The Ethernet component 170 will communicate, via a transceiver 180, and a physical transmission device (e.g., an Ethernet cable 190) with other Ethernet components by sending Ethernet frames (e.g., frames 192 through 194). Such frames may have different formats but typically are in IEEE 802.3 format. An Ethernet frame has fields including a destination address, a source address, a type field and data. Each computer communicating via an Ethernet device has its own unique Ethernet address 172 (a.k.a. physical address) and listens for Ethernet frames with that destination address. All such devices also listen for Ethernet frames whose destination address indicates that the frame is a "broadcast" frame.

In one example of network traffic that may be generated by a node implemented in accordance with Prior Art FIG. 2, when transmitting an IP packet (e.g., IP Packet 150), the destination Ethernet address is determined by employing the ARP component 160. The IP address to Ethernet address translation is done for outgoing IP packets when the IP header and the Ethernet header are created. The translation employs a table look-up. The look-up table, called the ARP table, (a.k.a. as an ARPCache) is stored in memory and contains a row for computers for which ARP has resolved IP address/physical address information. Such a table, or other suitable data store, is employed because IP addresses (e.g., IP address 154) may be selected by network managers (e.g., based on location of computer on a network) and Ethernet addresses (e.g., Ethernet address 172) are set by the manufacturer of the Ethernet network interface device and there is no direct, inquiry-free algorithm for converting the manager assigned IP addresses to the device assigned Ethernet addresses. The ARPCache is filled dynamically and automatically by the ARP component 160 as requests and responses are encountered. If an outgoing IP packet (e.g., IP Packet 150) is encountered for which there is no ARPCache entry, then an ARP request packet with a broadcast Ethernet address is sent to the network (e.g., via the Ethernet cable 190 and the transceiver 180, in one or more Ethernet frames (e.g., frames 192 through 194)), where active machines on the network will receive the broadcast ARP request packet. In one example network application, the outgoing IP packet (e.g., IP Packet 150) is queued, awaiting a response to the ARP broadcast that contains the Ethernet address for the broadcasted IP address. In another example network application, the outgoing IP packet (e.g., IP Packet 150) may be discarded, and by the time a retry timer has timed out and retransmission of the outgoing packet is scheduled, the ARPCache may have been populated with a valid physical address returned in a reply to the ARP request.

A conventional ARP request packet contains fields including the sender IP address (e.g., IP address 154), the sender Ethernet address (e.g., Ethernet address 172), a target IP address and a target Ethernet address (which may be a broadcast address). If the IP address of a receiving machine matches the target IP address, then the receiving machine generates an ARP response with fields including the sender IP address (the IP address of the responding machine), the sender Ethernet address (the missing piece of information for which the query was sent), the target IP address (IP address of querying machine) and the target Ethernet address (Ethernet address of querying machine). The querying machine can thus update its ARPCache and forward the queued IP packet or successfully perform the retransmission. If there is no reply to the broadcast query, then the queued IP packet will be discarded and/or the retransmission will fail.

Sample fields in an ARP Request/Response packet include:

| Field | Function |
|---|---|
| Hardware address space | Specifies type of hardware (e.g., Ethernet). |
| Protocol address space | Specifies type of protocol |
| Hardware address length | Specifies length (in bytes) of hardware addresses in packet |
| Protocol address length | Specifies length (in bytes) of protocol addresses in packet |
| Operation code | Specifies ARP request (1) or reply (2). |
| Source/target hardware address | Contains physical network hardware addresses |
| Source/target protocol address | Contains the protocol addresses |

While the prior examples have been described primarily in the context of an Ethernet physical layer, it is to be appreciated that other physical layers (e.g., token ring, FDDI, x.25, wireless, asynchronous) may be employed by the present invention.

Figure 3:
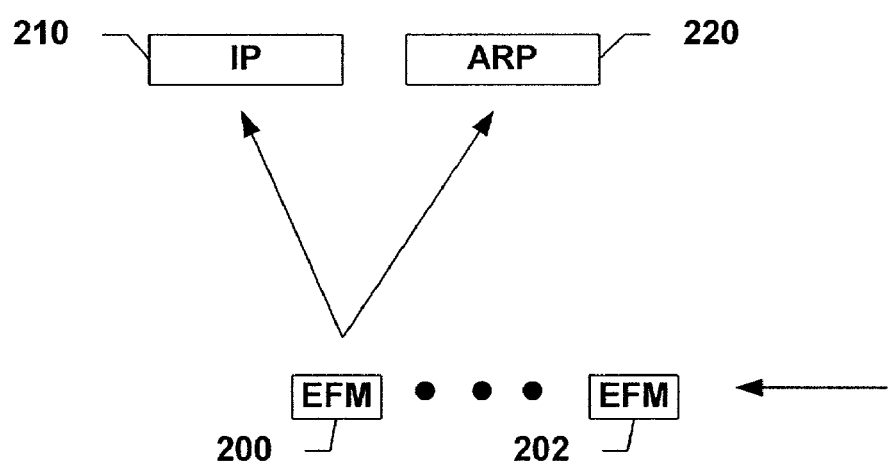
FIG. 3 is a schematic block diagram of a conventional IP/ARP (Address Resolution Protocol) traffic partition.

Prior Art FIG. 3 illustrates the partitioning of conventional IP/ARP (Address Resolution Protocol) traffic. Based, for example, on one or more pieces of information encoded in a frame and/or packet header, a first Ethernet frame (e.g., frame 200) may be routed to an IP component 210 while a second Ethernet frame (e.g., frame 202) may be routed to an ARP component 220. Such conventional partitioning facilitates implementing the ARP IP/physical address resolution protocol and further facilitates limiting the overhead associated with such protocol. In one example partitioning of network traffic, the frames are routed to either the IP component 210 or the ARP component 220 based on the type field in Ethernet frames. While the IP component 210 and the ARP component 220 are illustrated as separate components, it is to be appreciated that the ARP functionality may be incorporated into an IP component.

Figure 4:
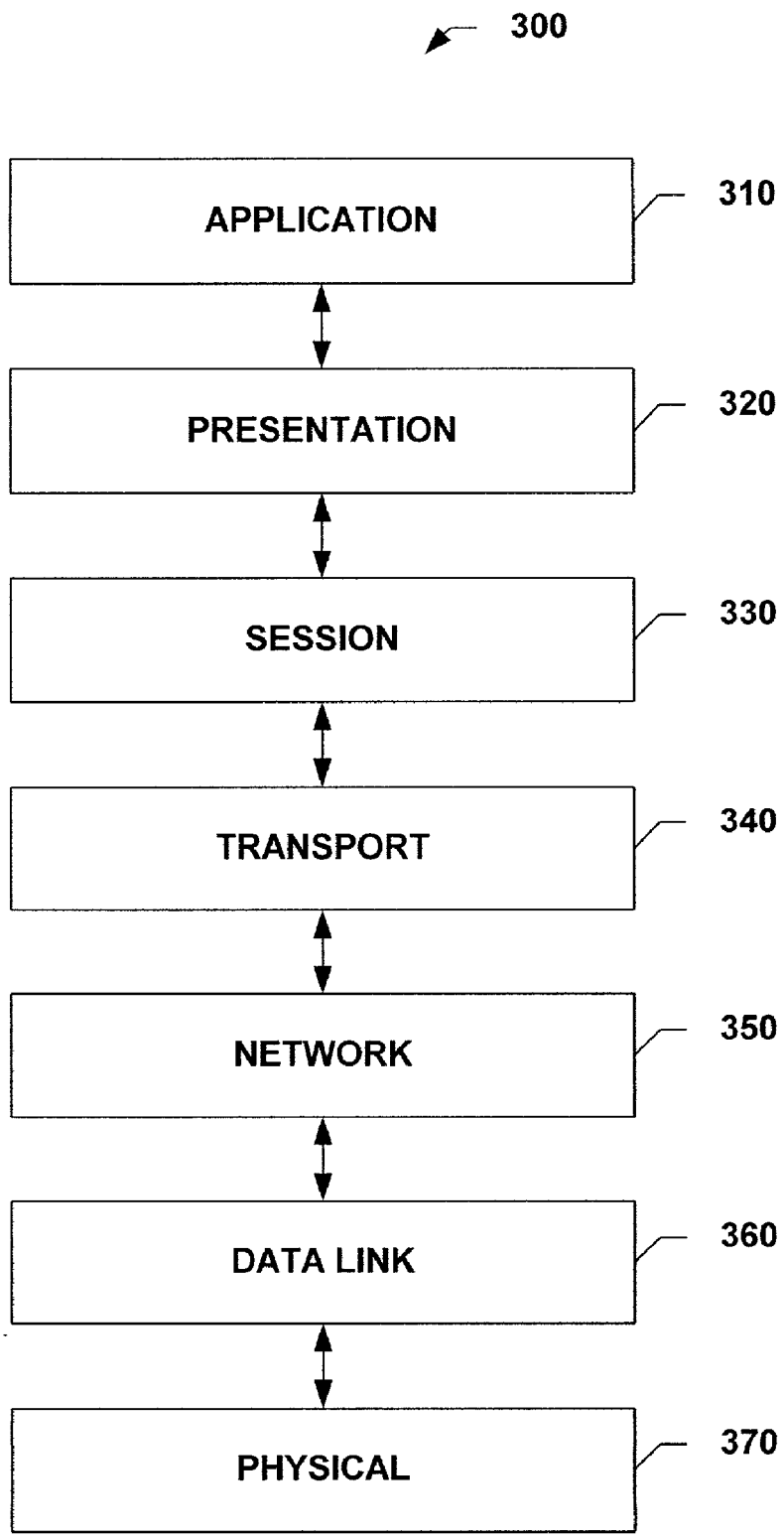
FIG. 4 is a schematic block diagram of the OSI networking stack.

Prior Art FIG. 4 illustrates the conventional OSI networking stack 300. While the stack 300 may be employed primarily in academic settings to describe a theoretical model, a review of the logical layers implemented by the stack 300 facilitates understanding the level at which ARP components act. An application layer 310 resides at the top of the stack. The application layer 310 should be unaware of the presence of and/or functionality of an ARP component. Typical applications found at the application layer 310 include X.400 electronic mail services, X.500 directory services, X.700 management services and EDI (Electronic Document Interchange) applications. A presentation layer 320 resides below the application layer 310 and the presentation layer 320 should similarly be unaware of the presence and/or functionality of an ARP component. The presentation layer 320 deals with the representation (syntax) of data in messages coming from and going to applications. The presentation layer 320 attempts to ensure that messages exchanged between applications share semantics. In addition, the presentation layer 320 is typically involved in data encryption and data security.

A session layer 330 resides below the presentation layer 320 and once again the session layer 330 should similarly be unaware of the presence and/or functionality of an ARP component. The session layer 330 typically provides applications (e.g., in the application layer 310) with data streams oriented to a session user. A transport layer 340 resides below the session layer 330. One example transport layer 340 employs TCP components that interact with IP components that reside in a network layer 350. The TCP components should be unaware of the ARP processing and should simply receive a stream of TCP Segments (e.g., 130 through 132, Prior Art FIG. 2) from IP components. The network layer 350 (e.g., the IP components), are aware of the ARP presence and functions because it is the translation of IP addresses to physical addresses with which the ARP components are concerned. Such translation is necessary because network layer components (e.g., IP components) are conventionally associated with an IP address (which is hopefully unique), but lower layers (e.g., a physical layer 370) are conventionally associated with a hard coded physical address. Thus the physical layer 370 (e.g., an Ethernet layer) is aware of the ARP component presence and functions. The network layer 350 is employed in sending/receiving packets of data end to end from the source to the destination, over intermediate nodes if necessary.

Figure 5:
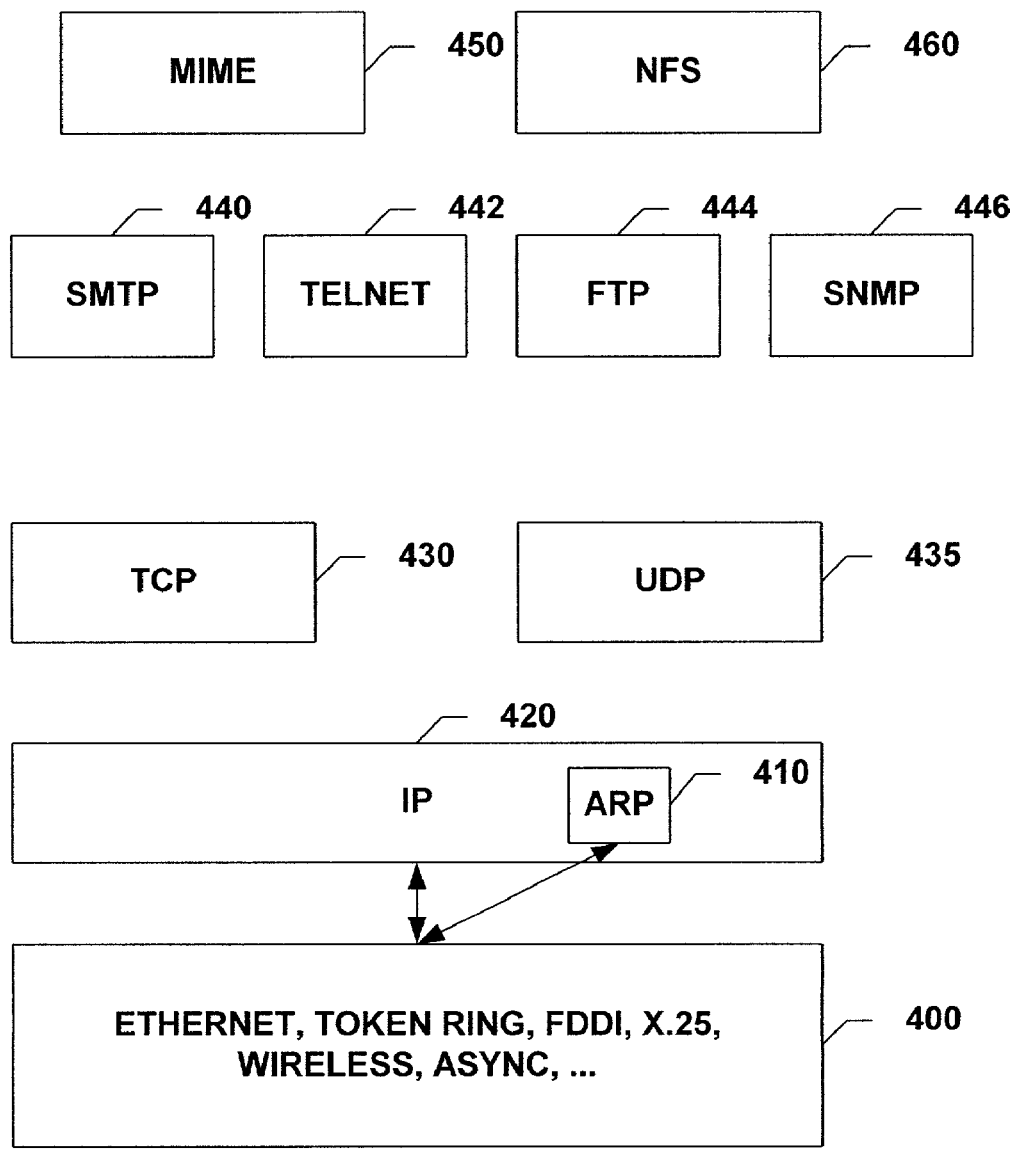
FIG. 5 is a schematic block diagram of a conventional network application through physical layer implementation.

Turning from the academic OSI stack of Prior Art FIG. 4 to an example stack, Prior Art FIG. 5 illustrates one example configuration that may employ ARP processing. A MIME (Multipurpose Internet Mail Extension) application 450 and an NFS (Network File System) application 460 may reside at the top of the example stack illustrated in Prior Art FIG. 5. The MIME application 450 and the NFS application 460 may be unaware of the ARP component 410 and its functionality. Similarly, a number of lower level applications (e.g., an SMTP (Simple Mail Transport Protocol) application 440, a telnet application 442, an FTP (File Transfer Protocol) application 444, and an SNMP (Simple Network Management Protocol) application 446) may reside below the MIME application 450 and the NFS application 460 and may remain unaware of the ARP component 410 and its functionality. The lower level applications (e.g., the SMTP application 440, the telnet application 442, the FTP application 444, and the SNMP application 446) may interact with an IP component 420 via a TCP component 430 or a UDP component 435, for example. It is the IP component 420 that is associated with an IP address that may require translation to a physical address. Thus, the IP component 420 is likely to be aware of the ARP component 410. In the ARP implementation illustrated in Prior Art FIG. 5 the ARP component 410 has been implemented within the IP component 420. The ARP component 410 is employed to convert the IP address with which the IP component 420 is associated to a physical address with which a physical layer component 400 is associated. Similarly, the ARP component 410 may store resolved IP/physical address pairs associated with other nodes on a network. Such IP/physical address pairs are conventionally stored in a table, with one row per IP/physical address resolved pair. However, it is to be appreciated that other data structures may be employed in accordance with implementing ARP components 410. For example, the ARP component 410 may store resolved IP/physical addresses in data structures including, but not limited to, one or more tables, databases, arrays, stacks, queues, heaps, trees and hashes, which may reside on a single logical and/or physical device and/or may be distributed between two or more logical and/or physical devices.

The physical layer 400 is concerned with transmitting messages between physical devices, and thus each physical device is conventionally associated with a unique physical address. It is the physical addresses of the physical devices that require converting to IP addresses, with such conversion typically performed by the ARP component 410.

Figure 6:
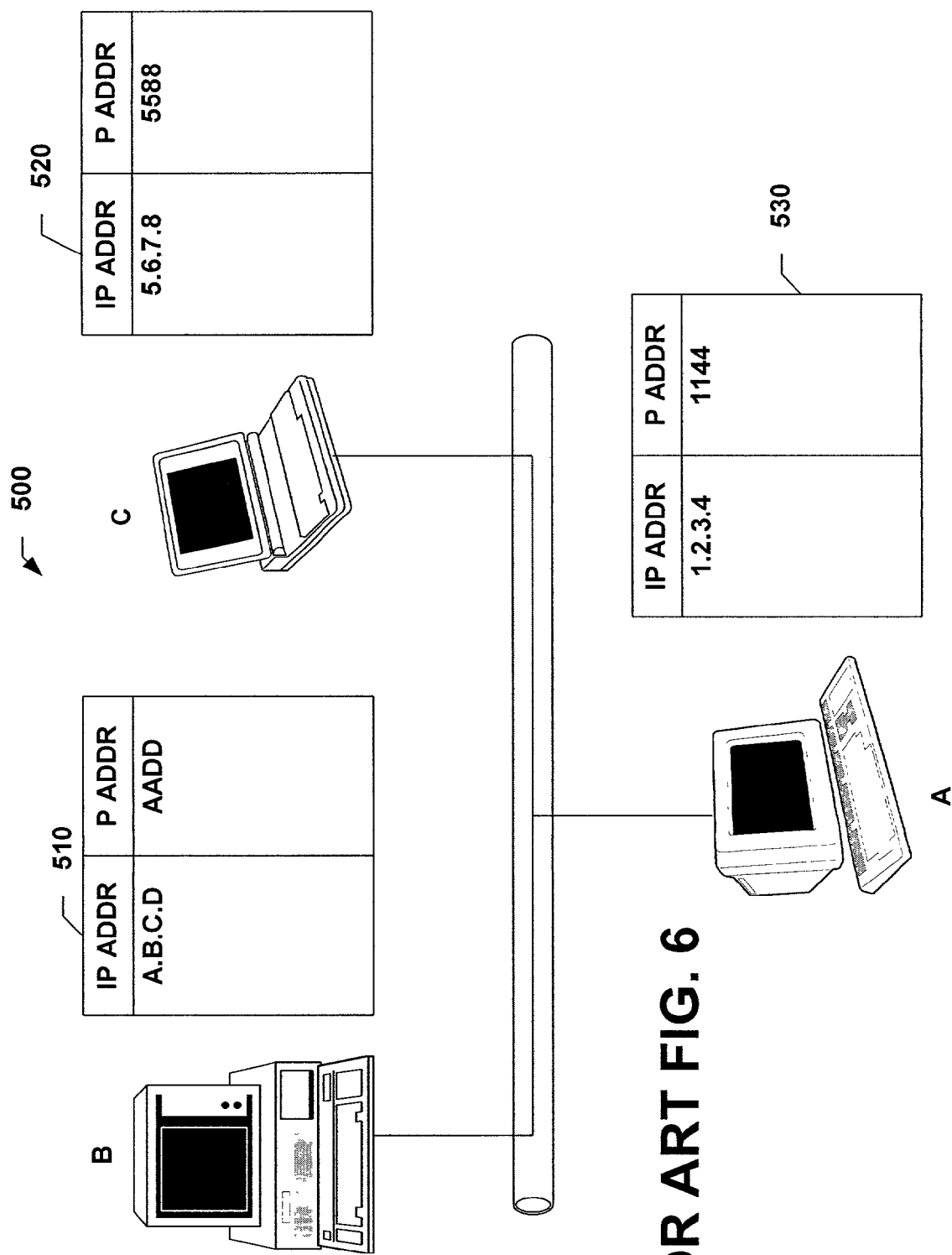
FIG. 6 is a schematic block diagram of three computers networked together, where the networking includes ARP Cache tables (ARPCaches) and where the computers have not yet communicated.
Figure 7:
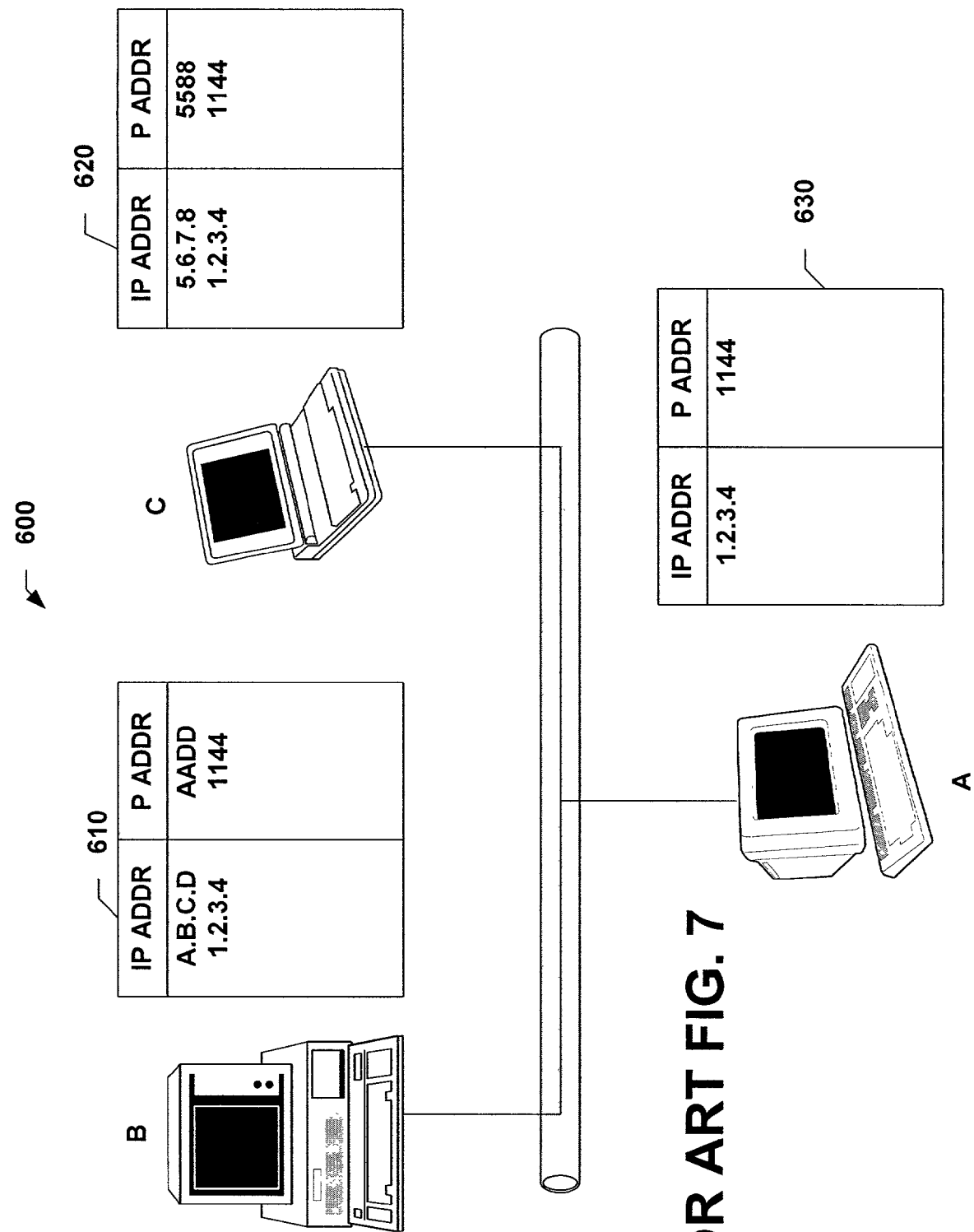
FIG. 7 is a schematic block diagram of three computers networked together, where the networking includes ARPCaches and where one of the three computers has announced its presence conventionally via an ARP broadcast.

Prior Art FIG. 6 illustrates a computer network 500 where three computers (A, B, C) are networked together. The networking involves ARP Cache tables (ARPCaches). Computer A is associated with an ARPCache 530, computer B is associated with an ARPCache 510 and computer C is associated with an ARPCache 520. At the point in time associated with Prior Art FIG. 6, the three computers have not yet communicated, and have not broadcast their IP/physical address resolved pairs, and thus the ARPCaches contain only the "static" addresses associated with the computers. Thus, the ARPCache 530 contains the IP address 1.2.3.4 and its associated physical address 1144. Similarly, the ARPCache 510 contains the IP address A.B.C.D and the associated physical address AADD and the ARPCache 520 contains the IP address 5.6.7.8 and the associated physical address 5588. It is to be appreciated that the IP addresses and physical addresses illustrated in the figures are merely representative and that actual IP addresses and/or physical addresses may have different formats from those illustrated. It can be seen that in such an initial state, machines know their own IP address and their own physical address (paddr). When the machines attempt to communicate via the network, the ARPCaches of the communicating machines will be updated. Conventionally, such updating is accomplished by employing ARP request/response pairs. Thus, turning to Prior Art FIG. 7, a network 600 comprising three computers networked together (computer A, computer B, computer C) is illustrated, The network 600 includes ARPCaches. Computer A is associated with an ARPCache 630, computer B is associated with an ARPCache 610 and computer C is associated with an ARPCache 620. At the point in time associated with Prior Art FIG. 7, the ARPCaches contain the "static" addresses associated with the computers. Thus, the ARPCache 630 contains the IP address 1.2.3.4 and its associated physical address 1144. Similarly, the ARPCache 610 contains the IP address A.B.C.D and the associated physical address AADD and the ARPCache 620 contains the IP address 5.6.7.8 and the associated physical address 5588.

In addition to the static addresses, machine A has broadcast its resolved IP/physical address pair onto the network by, for example, a conventional ARP broadcast. Thus, the ARPCache 610 includes the IP address 1.2.3.4 and the associated physical address 1144, where the IP/physical address pair represents the resolved IP/physical address pair provided by machine A. Similarly, the ARPCache 620 includes the IP address 1.2.3.4 and the associated physical address 1144, where the IP/physical address pair represents the resolved IP/physical address pair provided by machine A. Updating ARPCaches when a machine attaches to a network using the broadcast method illustrated in Prior Art FIG. 7 leads to potential duplicate IP address problems that are addressed by the present invention.

Figure 8:
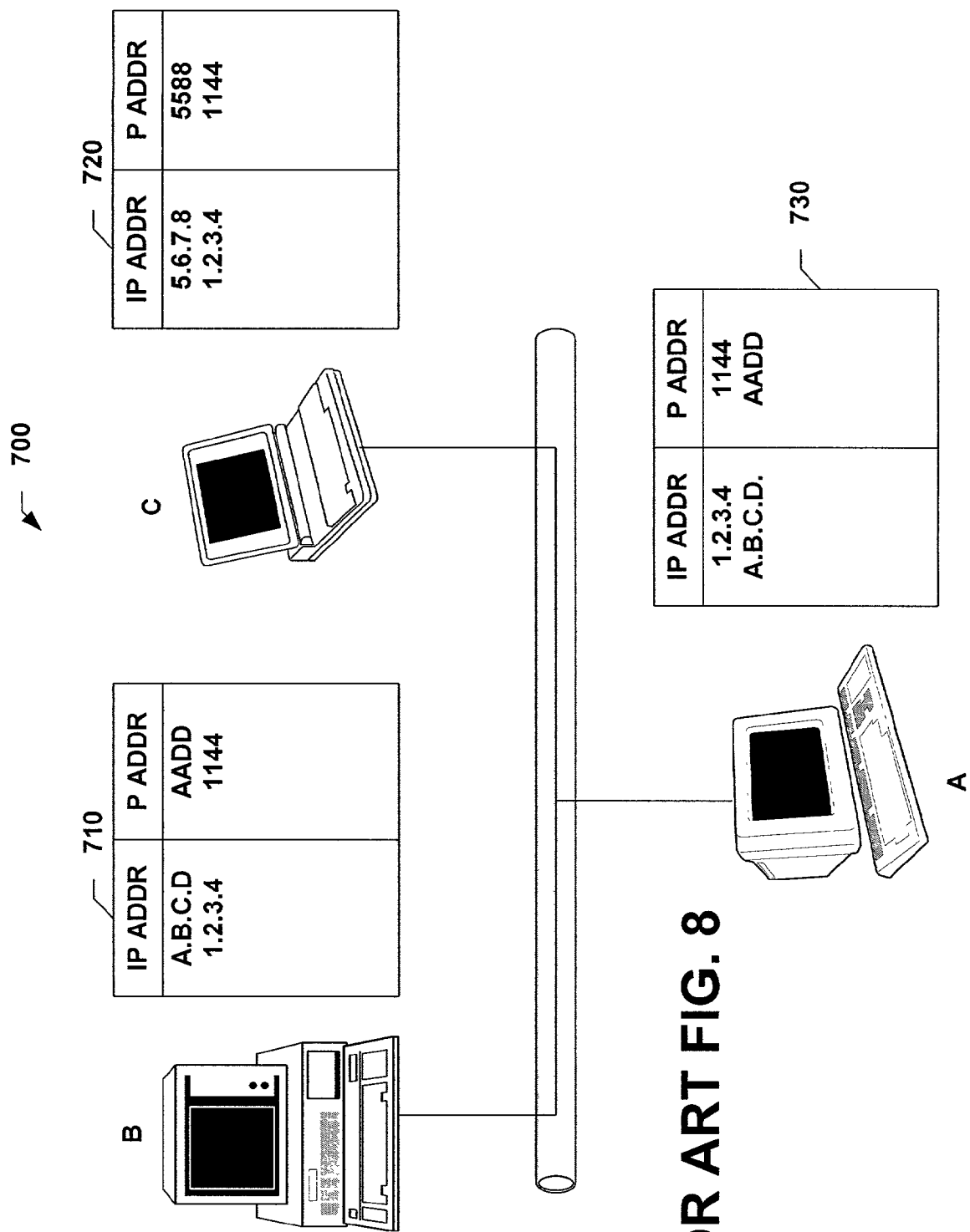
FIG. 8 is a schematic block diagram of three computers networked together, where the networking includes ARPCaches and where one of the three computers is attempting to communicate conventionally.

Prior Art FIG. 8 illustrates a network 700 comprising three computers networked together (computer A, computer B, computer C). The network 700 includes ARPCaches. Computer A is associated with an ARPCache 730, computer B is associated with an ARPCache 710 and computer C is associated with an ARPCache 720. At the point in time associated with Prior Art FIG. 8, the ARPCaches contain the "static" addresses associated with the computers. Thus, the ARPCache 730 contains the IP address 1.2.3.4 and its associated physical address 1144. Similarly, the ARPCache 710 contains the IP address A.B.C.D and the associated physical address AADD and the ARPCache 720 contains the IP address 5.6.7.8 and the associated physical address 5588. In addition to the static addresses, machine A has broadcast its resolved IP/physical address pair onto the network by, for example, a conventional ARP broadcast. Thus, the ARPCache 710 includes the IP address 1.2.3.4 and the associated physical address 1144, where the IP/physical address pair represents the resolved IP/physical address pair provided by machine A. Similarly, the ARPCache 720 includes the IP address 1.2.3.4 and the associated physical address 1144, where the IP/physical address pair represents the resolved IP/physical address pair provided by machine A.

In addition to the static addresses and the information broadcast by machine A, the ARPCache 730 also contains an entry with an IP address A.B.C.D and a physical address AADD, which represent the resolved IP/physical address of machine B. The ARPCache 730 was updated in response to A's attempt to communicate with machine B. When A wanted to communicate with B, A sent an ARP request with a source IP address of 1.2.3.4, a source physical address of 1144, a target IP address of A.B.C.D (which represents the IP address of the machine with which A wants to communicate) and a target physical address of 0, representing the fact that machine A does not know, but would like to know, the physical address of the machine associated with the IP address A.B.C.D. When machine C encountered the ARP request, it determined that the IP address did not match its IP address, and thus machine C ignored the request. But when machine B encountered the ARP request, it determined that the IP address did match its IP address, and thus machine B replied to the ARP request. B generated an ARP response with a source IP address A.B.C.D, a source physical address AADD (which was used to fill in the ARPCache 730), a target IP address of 1.2.3.4 (the IP address of the machine A that requested the response) and a target physical address of 1144 (the physical address of the machine A that requested the response). Machine A receives the reply, determines that the target IP address matches its IP address, and updates its ARPCache based on the reply generated by machine B. This conventional method is susceptible to problems generated by duplicate addresses. One such problem will be illustrated in connection with Prior Art FIGS. 8 through 11.

Figure 9:
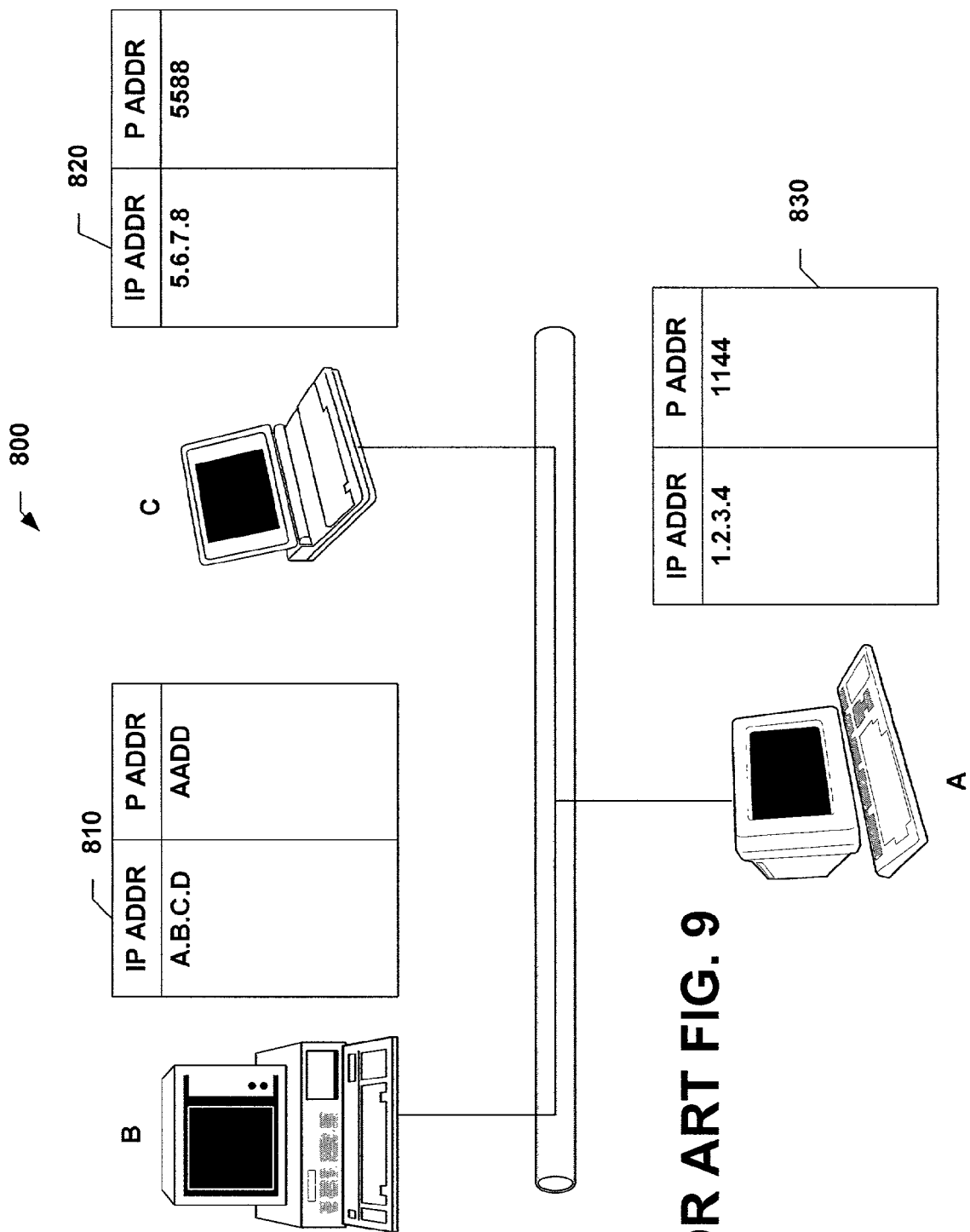
FIG. 9 is a schematic block diagram of three computers networked together, where the networking includes ARPCaches and where the three computers have come online without announcing their presence via an ARP broadcast.

Thus, turning to Prior Art FIG. 9, a computer network 800 where three computers (A, B, C) are networked together is illustrated. None of the three computers has announced its presence via an ARP broadcast. The network 800 involves ARP Cache tables (ARPCaches). Computer A is associated with an ARPCache 830, computer B is associated with an ARPCache 810 and computer C is associated with an ARPCache 820. At the point in time associated with Prior Art FIG. 9, the three computers have not yet communicated, and have not broadcast their IP/Physical address resolved pairs, and thus the ARPCaches contain only the "static" addresses associated with the computers. Thus, the ARPCache 830 contains the IP address 1.2.3.4 and its associated physical address 1144. Similarly, the ARPCache 810 contains the IP address A.B.C.D and the associated physical address AADD and the ARPCache 820 contains the IP address 5.6.7.8 and the associated physical address 5588. When the machines attempt to communicate the ARPcaches of the communicating machines will be updated. Conventionally, such updating is accomplished by employing ARP request/response pairs as discussed in association with Prior Art FIG. 8. But such conventional methods can lead to duplicate IP address problems, as described below.

Figure 10:
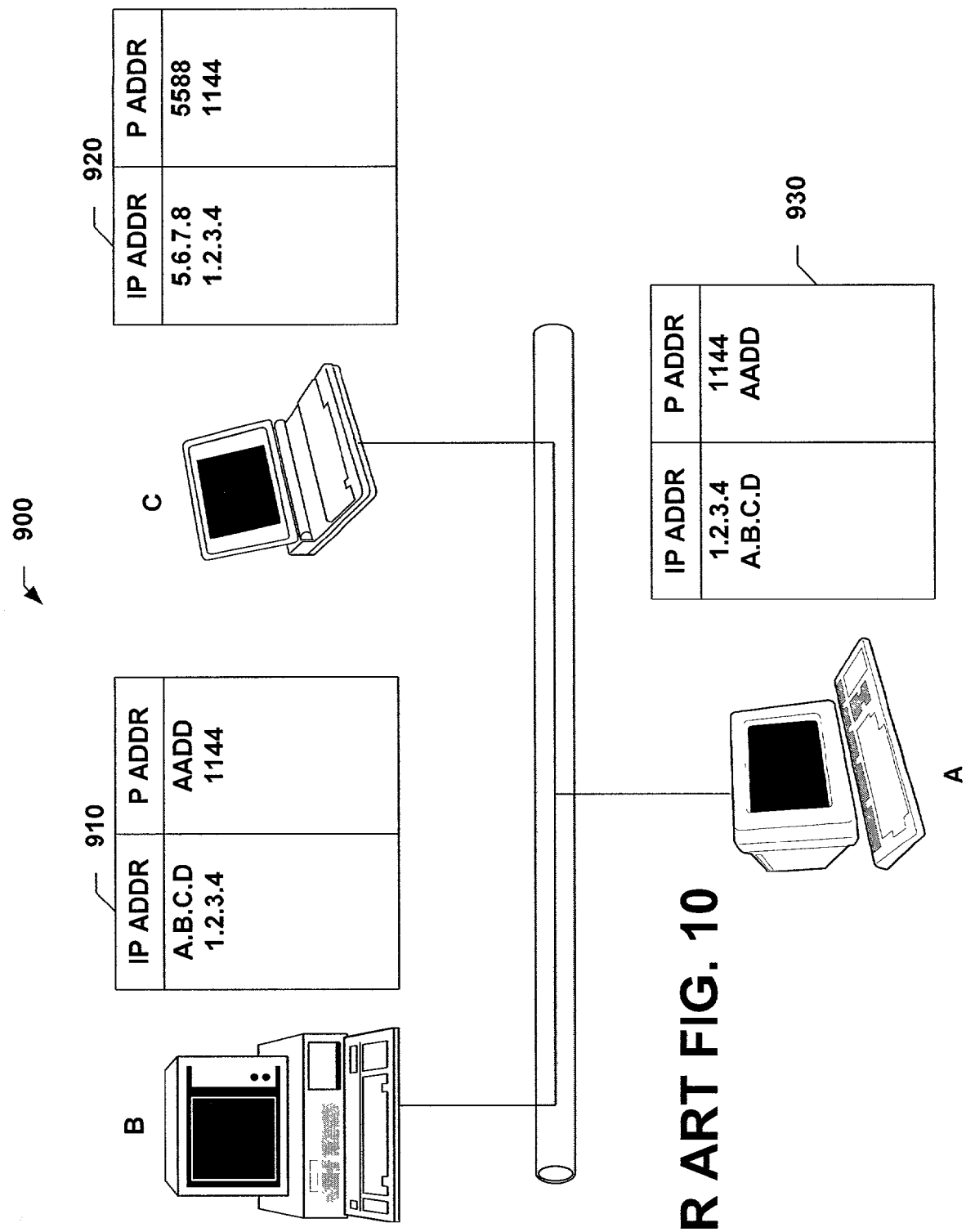
FIG. 10 is a schematic block diagram of three computers networked together, where the networking includes ARPCaches and where one of the three computers is attempting to communicate conventionally.

Prior Art FIG. 10 illustrates a network 900 comprising three computers networked together (computer A, computer B, computer C). The network 900 includes ARPCaches. Computer A is associated with an ARPCache 930, computer B is associated with an ARPCache 910 and computer C is associated with an ARPCache 920. At the point in time associated with Prior Art FIG. 10, the ARPCaches contain the "static" addresses associated with the computers. Thus, the ARPCache 930 contains the IP address 1.2.3.4 and its associated physical address 1144. Similarly, the ARPCache 910 contains the IP address A.B.C.D and the associated physical address AADD and the ARPCache 920 contains the IP address 5.6.7.8 and the associated physical address 5588.

ARPCache 930 also contains an entry with an IP address A.B.C.D and a physical address AADD, which represent the resolved IP/physical address of machine B. The ARPCache 930 was updated in response to A's attempt to communicate with machine B. When A wanted to communicate with B, A sent an ARP request with a source IP address of 1.2.3.4, a source physical address of 1144, a target IP address of A.B.C.D (which represents the IP address of the machine with which A wants to communicate) and a target physical address of 0, representing the fact that machine A does not know, but would like to know, the physical address of the machine associated with the IP address A.B.C.D. When machine C encountered the ARP request, it determined that the IP address did not match its IP address, but it also determined that it did not have the resolved pair 1.2.3.4 and 1144. Thus, machine C updated its ARPCache 920 with such a pair. When machine B encountered the ARP request, it determined that the IP address did match its IP address, and thus machine B replied to the ARP request. B generated an ARP response with a source IP address A.B.C.D, a source physical address AADD (which was used to fill in the ARPCache 730), a target IP address of 1.2.3.4 (the IP address of the machine A that requested the response) and a target physical address of 1144 (the physical address of the machine A that requested the response). Machine B similarly determined that it did not have the resolved pair 1.2.3.4 and 1144. Thus, machine B updated its ARPCache 910 with such a pair.

Machine A received the reply, determined that the target IP address matched its IP address, and updated its ARP-Cache based on the reply generated by machine B. This conventional method is susceptible to problems generated by duplicate addresses as will be described in connection with Prior Art FIG. 11.

Figure 11:
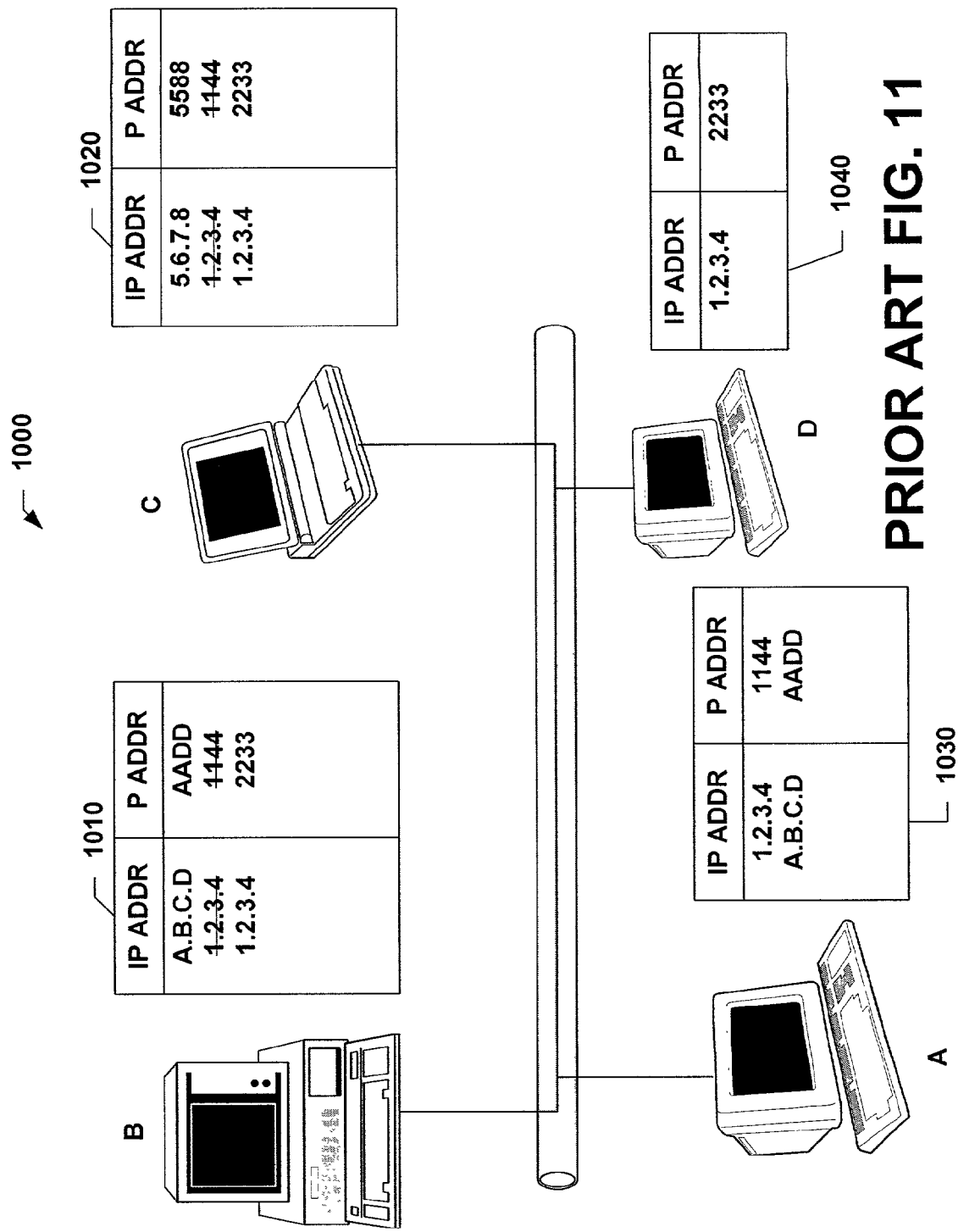
FIG. 11 is a schematic block diagram of four computers networked together, where the networking includes ARPCaches and where the fourth computer has come online and announced its presence via an ARP broadcast, where the fourth computer has a duplicate IP address.

Prior Art FIG. 11 illustrates four computers A, B, C, and D networked together. Machines A, B and C had previously arrived at the state illustrated in Prior Art FIG. 10 by the methods described in Prior Art FIGS. 8 and 9. Then, machine D came online and announced its presence via an ARP broadcast. Note that machine D has an IP address 1.2.3.4 that is a duplicate of the IP address of machine A. However, the physical addresses (2233 and 1144) do not match. When machine D came online, and announced its presence via a conventional ARP broadcast, machines B and C updated their ARPCaches. For example, machine B noted the broadcast from D, determined that it had an entry for the IP address 1.2.3.4, but also determined to overwrite that entry, and replace the old resolved pair of 1.2.3.4 and 1144 with the newly encountered resolved pair of 1.2.3.4 and 2233. Similarly, machine C noted the broadcast from D, determined that it had an entry for the IP address 1.2.3.4 but also determined to overwrite that entry, and replace the old resolved pair of 1.2.3.4 and 1144 with the newly encountered resolved pair of 1.2.3.4 and 2233. Such a determination may have been based, for example, on an assumption that the resolved IP address/physical address pair changed because an IP component updated its networking hardware. Thus, the groundwork for problems associated with a duplicate IP address has been laid. Machine A, which also encountered the broadcast from D, did not update its ARP-Cache 1030 since a machine will typically not overwrite its static address. Now, when machine A wants to communicate with machine B, machine A sends a message with a source IP address of 1.2.3.4, a source physical address of 1144, a target IP address of A.B.C.D and a target physical address of AADD. Thus, machine B determines that it is the intended recipient of the message, and further determines that no updating of the ARPCache 1010 is required since all source and destination addresses are populated, the message is not an ARP request (e.g., as indicated by values in one or more header fields), and ARPCache entries exist for the provided addresses. When machine B formats its response to the message from machine A, machine B will populate the one or more headers in one or more packets and/or Ethernet frames with the information in the ARPCache 1010, which will route the packets and frames to machine D, not to machine A. Thus, machine A will not receive the reply packets that it is expecting, and may retransmit replacement packets, which may be handled in the same manner by machine B. Furthermore, machine D will begin receiving a supply of reply packets that it is not expecting, which may include a large number of duplicates in response to the retransmissions from machine A. Such a situation can be difficult to debug and remedy. As the condition persists, and more packets are generated during the duplicate address situation, machines A, B and D become vulnerable to crashes, and other problems. Thus, a method to identify and prevent the duplicate IP address situation is still needed.

Described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for a probing entity to detect a duplicate IP address, the method comprising:
   generating an identifying value that identifies a random period of time to wait before probing a network with which a probing entity desires to interact;
   waiting a random period of time related to the identifying value;
   sending one or more first ARP probes onto the network with which the probing entity desires to interact;
   determining whether a response to the first ARP probes indicates that there is a duplicate IP address conflict;
   determining whether the probing entity is connected to an active network, comprising:
      analyzing network traffic received by a network interface associated with the probing entity;
      analyzing electrical signals received from hardware associated with the network with which the probing entity desires to interact; and
      analyzing BPDUs (Bridge Protocol Data Units) received by a network device associated with the network with which the probing entity desires to interact;
   sending one or more second ARP probes onto the network with which the probing entity desires to interact; and
   determining whether a response to the second ARP probes indicates that there is a duplicate IP address conflict.

2. The method of claim 1, comprising:
   sending ARP probes until the probing entity is connected to an active network.

3. The method of claim 2, comprising:
   not employing the potentially duplicate IP address until after all the processing associated with claim 2 has been completed.

4. The method of claim 1, the length of the random period of time is generated by examining at least one of a GUID, a physical address, an IP address and a counter.

5. The method of claim 1, the one or more first ARP probes contain the physical address of the probing entity and a potentially duplicate IP address.

6. The method of claim 5, the response to the first ARP probes contain the physical address of the probing entity, the physical address of a responding entity, the IP address of a responding entity and the potentially duplicate IP address.

7. The method of claim 6, determining whether a response to the first ARP probes indicates that there is a duplicate IP address conflict comprises comparing the potentially duplicate IP address of the response to the potentially duplicate IP address associated with the probing entity.

8. The method of claim 7, the one or more second ARP probes contain the physical address of the probing entity and a potentially duplicate IP address.

9. The method of claim 8, the response to the second ARP probes contain the physical address of the probing entity, the physical address of the responding entity, the IP address of the responding entity and the potentially duplicate IP address.

10. The method of claim 9, determining whether a response to the second ARP probes indicates that there is a duplicate IP address conflict comprises comparing the potentially duplicate IP address of the response to the potentially duplicate IP address associated with the probing entity.

11. A computer readable medium storing computer executable instructions operable to perform a method for a probing entity to detect a duplicate IP address, the method comprising:
  generating an identifying value that identifies a random period of time to wait before probing a network with which a probing entity desires to interact;
  waiting a random period of time related to the identifying value;
  sending one or more first ARP probes onto the network with which the probing entity desires to interact;
  determining whether a response to the first ARP probes indicates that there is a duplicate IP address conflict;
  determining whether the probing entity is connected to an active network, comprising:
    analyzing network traffic received by a network interface associated with the probing entity;
    analyzing electrical signals received from hardware associated with the network with which the probing entity desires to interact; and
    analyzing BPDUs (Bridge Protocol Data Units) received by a network device associated with the network with which the probing entity desires to interact;
  sending one or more second ARP probes onto the network with which the probing entity desires to interact; and
  determining whether a response to the second ARP probes indicates that there is a duplicate IP address conflict.

12. The computer readable medium of claim 11, the method further comprises:
  sending ARP probes until the probing entity is connected to an active network.

13. The computer readable medium of claim 12, the method further comprises:
  not employing the potentially duplicate IP address until after all the processing associated with claim 12 has been completed.

14. A system for detecting and preventing the use of duplicate IP addresses comprising:
  a random time period generator operable to produce a value representing a period of time that a probing entity should wait before invoking the processing of a probe generator;
  a probe generator operable to produce an ARP probe;
  a response analyzer operable to analyze a response to an ARP probe and to determine whether the response to the ARP probe indicates that an IP address associated with the probing entity is a duplicate IP address; and
  an active network detector operable to determine whether the system is connected to an active network, comprising:
    a network traffic analyzer that analyzes network traffic and determines whether the probing entity is connected to an active network;
    a network pulse analyzer that analyzes one or more electrical signals received from network devices operably connected to the probing entity and that determines whether the probing entity is connected to an active network; and
    a BPDU analyzer that analyzes one or more bridge protocol data units received by network devices operably connected to the probing entity and that determines whether the probing entity is connected to an active network.

15. A computer readable medium storing computer executable components of a system for detecting and preventing the use of duplicate IP addresses, the system comprising:
  a random time period generating component operable to produce a value representing a period of time that a probing entity should wait before invoking the processing of a probe generator component;
  a probe generating component operable to produce an ARP probe;
  a response analyzing component operable to analyze a response to an ARP probe and to determine whether the response to the ARP probe indicates that an IP address associated with the probing entity is a duplicate IP address; and
  an active network detecting component operable to determine whether the system is connected to an active network that comprises:
    a network traffic analyzer that analyzes network traffic;
    a network pulse analyzer that analyzes one or more electrical signals received from network devices operably connected to the probing entity; and
    a BPDU analyzer that analyzes one or more bridge protocol data units received by network devices operably connected to the probing entity.

16. A system for detecting and preventing the use of duplicate IP addresses comprising:
  means for identifying a random period of time that should be waited before a probe generating means is activated;
  means for generating an ARP probe;
  means for distributing the ARP probe to one or more IP components;
  means for interpreting a response to the ARP probe;
  means for determining whether a probing entity is connected to an active network;
  means for analyzing network traffic on a network interface associated with the probing entity;
  means for analyzing electrical signals on hardware associated with the network with which the probing entity is to interact; and
  means for analyzing BPDUs (Bridge Protocol Data Units) on a network device associated with the network with which the probing entity is to interact.

* * * * *